(12) United States Patent
Shen et al.

(10) Patent No.: US 11,827,786 B2
(45) Date of Patent: Nov. 28, 2023

(54) RESIN COMPOSITION AND ARTICLE MADE THEREFROM

(71) Applicant: Elite Electronic Material (KunShan) Co., Ltd., Kunshan (CN)

(72) Inventors: Chenyu Shen, Kunshan (CN); Jue Tan, Kunshan (CN)

(73) Assignee: ELITE ELECTRONIC MATERIAL (KUNSHAN) CO., LTD., Kunshan (CN)

( * ) Notice: Subject to any disclaimer, the term of this patent is extended or adjusted under 35 U.S.C. 154(b) by 143 days.

(21) Appl. No.: 17/559,421

(22) Filed: Dec. 22, 2021

(65) Prior Publication Data
US 2023/0151213 A1  May 18, 2023

(30) Foreign Application Priority Data

Nov. 5, 2021 (CN) .......................... 202111306545.1

(51) Int. Cl.
| | | |
|---|---|---|
| C08L 71/12 | (2006.01) | |
| B32B 27/28 | (2006.01) | |
| C08G 65/44 | (2006.01) | |
| C08K 5/3435 | (2006.01) | |
| C08K 5/3417 | (2006.01) | |
| C08K 5/529 | (2006.01) | |
| C08J 5/24 | (2006.01) | |
| C08J 5/18 | (2006.01) | |

(52) U.S. Cl.
CPC ............ C08L 71/126 (2013.01); C08G 65/44 (2013.01); C08J 5/18 (2013.01); C08J 5/249 (2021.05); C08K 5/3417 (2013.01); C08K 5/3435 (2013.01); C08K 5/529 (2013.01); *C08J 2371/12* (2013.01); *C08L 2203/16* (2013.01); *C08L 2203/20* (2013.01); *C08L 2312/02* (2013.01)

(58) Field of Classification Search
None
See application file for complete search history.

(56) References Cited

U.S. PATENT DOCUMENTS

| | | | | |
|---|---|---|---|---|
| 2006/0068317 A1* | 3/2006 | Klei | .......................... | C07F 9/12 |
| | | | | 430/270.1 |
| 2006/0247338 A1* | 11/2006 | Klei | ....................... | C08K 5/132 |
| | | | | 524/508 |

FOREIGN PATENT DOCUMENTS

CN  101717503 A  *  6/2010  ............. C08G 65/48

OTHER PUBLICATIONS

Machine translation of CN-101717503-A (no date).*

* cited by examiner

*Primary Examiner* — Michael J Feely
(74) *Attorney, Agent, or Firm* — Muncy, Geissler, Olds & Lowe, P.C.

(57) ABSTRACT

A resin composition includes: (A) a polyphenylene ether resin of Formula (1) and (B) a compound of Formula (3), and/or a compound of Formula (4), and/or a compound of Formula (5). An article is made from the resin composition. The article made from the resin composition may include a prepreg, a resin film, a laminate or a printed circuit board, and one or more properties including resin filling void, glass transition temperature, Z-axis ratio of thermal expansion, dielectric constant, dissipation factor, and warpage may be improved.

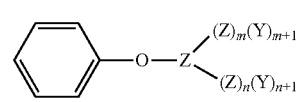

Formula (1)

10 Claims, 5 Drawing Sheets

RESIN COMPOSITION AND ARTICLE MADE THEREFROM

CROSS-REFERENCE TO RELATED APPLICATION

This application claims the priority benefits of China Patent Application No. 202111306545.1, filed on Nov. 5, 2021. The entirety the above-mentioned patent application is hereby incorporated by reference herein and made a part of this specification.

BACKGROUND

1. Field of the Disclosure

The present disclosure mainly relates to a resin composition and more particularly to a resin composition comprising a polyphenylene ether resin, which is useful for preparing electronic components such as a prepreg, a resin film, a laminate or a printed circuit board.

2. Description of Related Art

With the rapid development in electronic technology and the advent of the 5G generation, electronic components particularly printed circuit boards, such as printed circuit boards for mobile communication and automobile electronics, are experiencing further technology upgrade, which presents higher demands in the performance of fundamental insulation materials in printed circuit boards, such as requiring the fundamental insulation materials to have excellent thermal resistance, dielectric properties, dimensional stability and the like, so as to meet the processability requirements of printed circuit boards and other electronic components or devices.

Conventionally, commercial polyphenylene ether resins such as SA9000 were widely used as base resins for making low dielectric copper-clad laminates, but copper-clad laminates made from commercial polyphenylene ether resins have a low glass transition temperature and have poor compatibility with other resins, which causes the problems of high ratio of thermal expansion and poor warpage, therefore failing to meet the demands in developing new generation electronic components.

Accordingly, there is an urgent need to develop a resin composition that overcomes at least one of the aforesaid technical problems.

SUMMARY

To address the demands in the present technical field, inventors of this application, via thorough and extensive research and study, successfully develop a resin composition that can overcome the aforesaid technical problems, wherein the resin composition comprises:

(A) a polyphenylene ether resin of Formula (1):

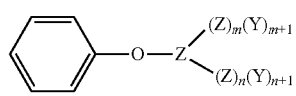

Formula (1)

wherein the Z group (or "Z" for short) is a structure of Formula (2):

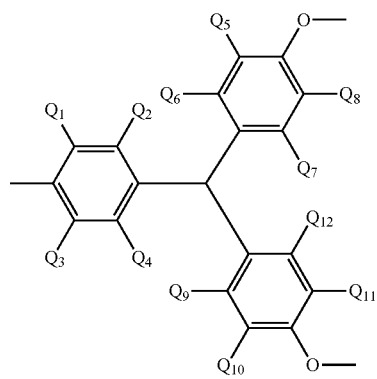

Formula (2)

in Formula (2), $Q_1$, $Q_2$, $Q_3$, $Q_4$, $Q_5$, $Q_6$, $Q_7$, $Q_8$, $Q_9$, $Q_{10}$, $Q_{11}$ and $Q_{12}$ are each independently hydrogen or a $C_1$-$C_6$ alkyl group;

the Y group (or "Y" for short) is an unsaturated bond-containing end group;

$(Z)_m$ represents containing m Z groups, wherein each Z group is bonded via an ether bond to one to three adjacent Z groups and optionally to one or two Y groups, wherein the ether bond is from the Z group itself or from an adjacent Z group;

$(Z)_n$ represents containing n Z groups, wherein each Z group is bonded via an ether bond to one to three adjacent Z groups and optionally to one or two Y groups, wherein the ether bond is from the Z group itself or from an adjacent Z group;

$(Y)_{m+1}$ represents containing m+1 independent Y groups, each Y group being independently bonded via an ether bond to the Z group, wherein the ether bond is from the Z group adjacent to the Y group;

$(Y)_{n+1}$ represents containing n+1 independent Y groups, each Y group being independently bonded via an ether bond to the Z group, wherein the ether bond is from the Z group adjacent to the Y group;

m and n are independently a positive integer and $8 \leq m+n \leq 40$;

and (B) a compound of Formula (3), and/or a compound of Formula (4), and/or a compound of Formula (5):

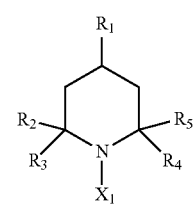

Formula (3)

-continued

Formula (4)
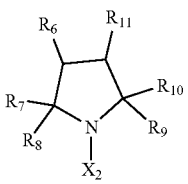

Formula (5)
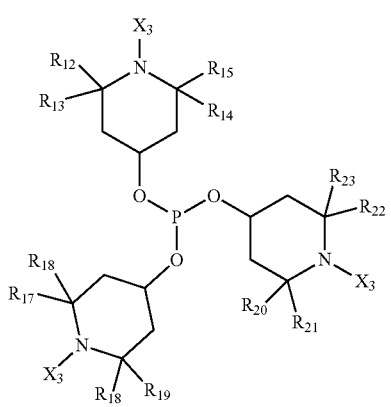

in Formula (3), $X_1$ is an oxygen radical or a hydroxyl group, $R_2$ to $R_5$ each independently represent a hydrogen atom or a $C_1$-$C_5$ alkyl group, $R_2$ to $R_5$ are not a hydrogen atom at the same time, and $R_1$ is a hydrogen atom, a $C_1$-$C_5$ alkyl group, an amino group, a hydroxyl group, a carbonyl group or a carboxyl group;

in Formula (4), $X_2$ is an oxygen radical or a hydroxyl group, $R_7$ to $R_{10}$ each independently represent a hydrogen atom or a $C_1$-$C_5$ alkyl group, $R_7$ to $R_{10}$ are not a hydrogen atom at the same time, and $R_6$ and $R_{11}$ are independently a hydrogen atom, a $C_1$-$C_5$ alkyl group, an amino group, a hydroxyl group, a carbonyl group or a carboxyl group, or $R_6$, Ru and carbon atoms bonded thereto together define a benzene ring;

in Formula (5), each $X_3$ is independently an oxygen radical or a hydroxyl group, $R_{12}$ to $R_{23}$ each independently represent a hydrogen atom or a $C_1$-$C_5$ alkyl group, and $R_{12}$ to $R_{23}$ are not a hydrogen atom at the same time.

For example, in one embodiment, the Y group in the polyphenylene ether resin of Formula (1) comprises one or more of the following unsaturated bond-containing end groups: $C_2$-$C_6$ alkenylbenzyl group, (meth)acryloyl group, phenylacryloyl group, fluorine-containing phenylacryloyl group and fluorine-containing $C_1$-$C_6$ alkylphenylacryloyl group.

For example, in one embodiment, the polyphenylene ether resin of Formula (1) comprises a polyphenylene ether resin of Formula (6), a polyphenylene ether resin of Formula (7), a polyphenylene ether resin of Formula (8) or a combination thereof:

Formula (6)
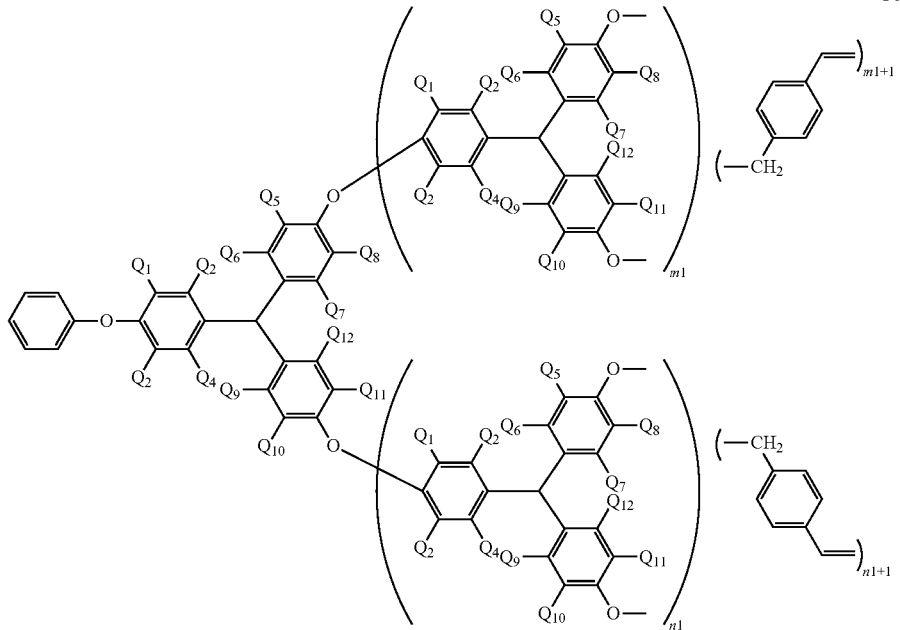

in Formula (6), m1 and n1 are independently a positive integer and $10 \leq m1+n1 \leq 35$;

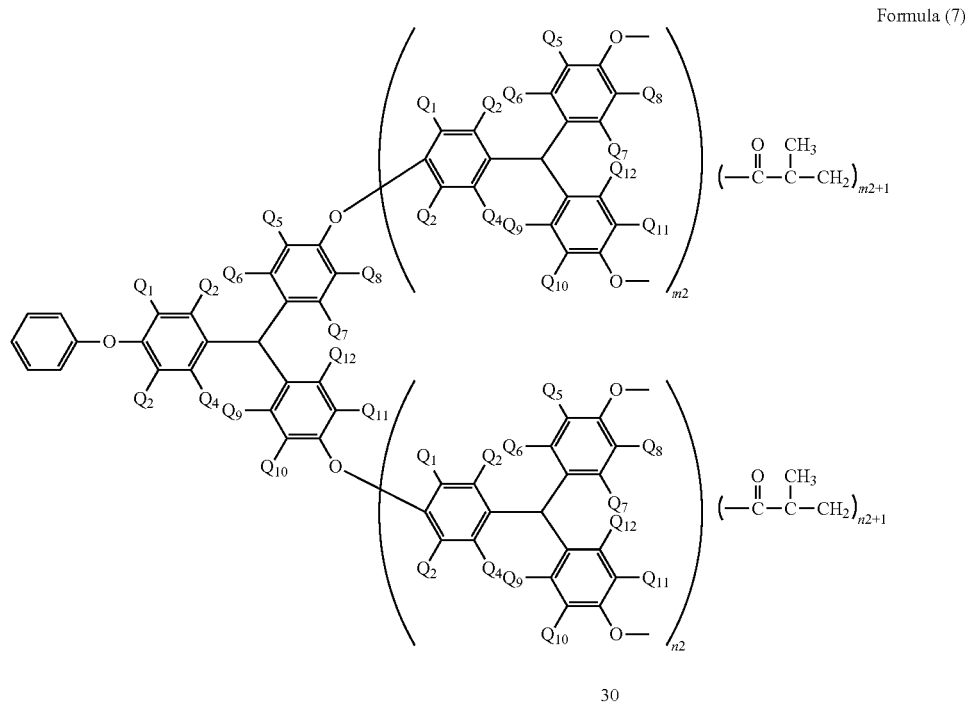

Formula (7)

in Formula (7), m2 and n2 are independently a positive integer and $10 \leq m2+n2 \leq 35$;

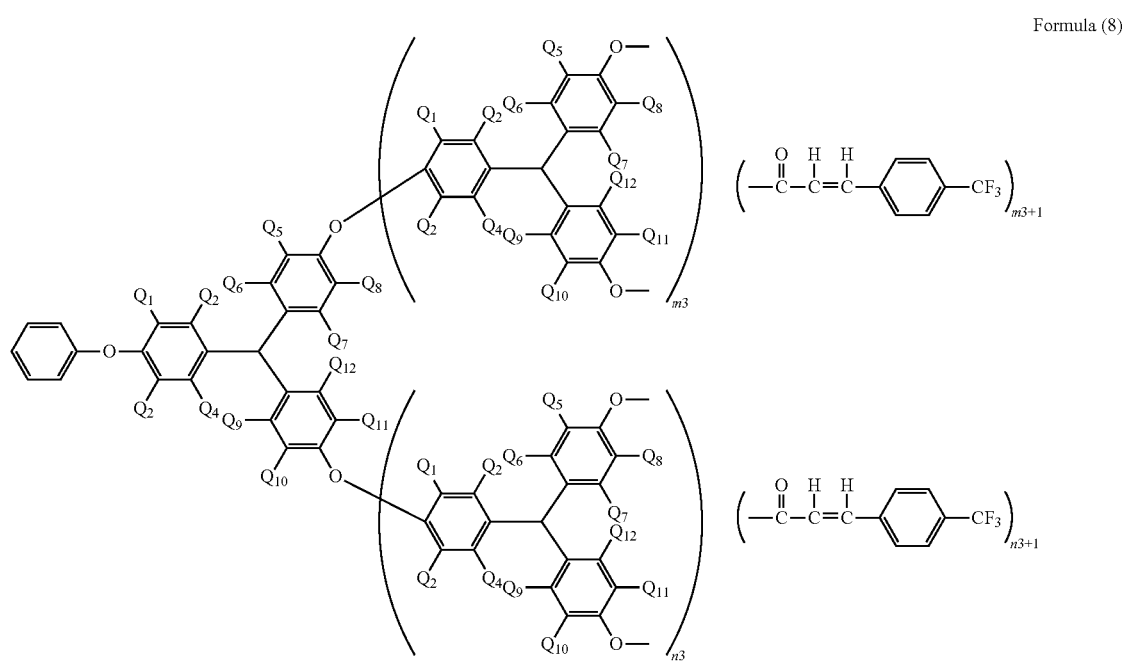

Formula (8)

in Formula (8), m3 and n3 are independently a positive integer and $10 \leq m3+n3 \leq 35$.

In one embodiment, the polyphenylene ether resin of Formula (1) has an a value of 0.30 to 0.42.

In one embodiment, the resin composition comprises 0.005 to 3 parts by weight of the compound of Formula (3), and/or the compound of Formula (4), and/or the compound of Formula (5) relative to 100 parts by weight of the polyphenylene ether resin of Formula (1).

In one embodiment, the resin composition further comprises a vinyl-containing crosslinking agent, wherein the vinyl-containing crosslinking agent comprises 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate or a combination thereof.

In addition, in one embodiment, the resin composition further comprises a benzoxazine resin, an epoxy resin, a polyester resin, a phenolic resin, a polyamide resin, a polyimide resin, a polyolefin, a styrene maleic anhydride, a maleimide resin, an organic silicone resin, a cyanate ester resin, a maleimide triazine resin or a combination thereof.

In addition, in one embodiment, the resin composition further comprises an additive which comprises flame retardant, curing accelerator, inorganic filler, surface treating agent, coloring agent, amine curing agent, toughening agent, solvent or a combination thereof.

In addition, in one embodiment, the resin composition further comprises 20 to 40 parts by weight of a vinyl-containing crosslinking agent and 15 to 50 parts by weight of a polyolefin relative to 100 parts by weight of the polyphenylene ether resin of Formula (1).

Another main object of the present disclosure is to provide an article made from the aforesaid resin composition, comprising a prepreg, a resin film, a laminate or a printed circuit board.

In one embodiment, articles made from the resin composition disclosed herein have one, more or all of the following properties:
- absence of void on the surface of a copper-free inner layer wiring laminate as measured by a resin filling void test;
- a glass transition temperature as measured by reference to IPC-TM-650 2.4.24.4 of greater than or equal to 246° C.;
- a Z-axis ratio of thermal expansion as measured by reference to IPC-TM-650 2.4.24.5 of less than or equal to 1.27%;
- a dielectric constant at 10 GHz as measured by reference to JIS C2565 of less than or equal to 3.3;
- a dissipation factor at 10 GHz as measured by reference to JIS C2565 of less than or equal to 0.0035; and a warpage as measured by a warpage test of less than or equal to 32 m.

DESCRIPTION OF THE EMBODIMENTS

Figure 1:
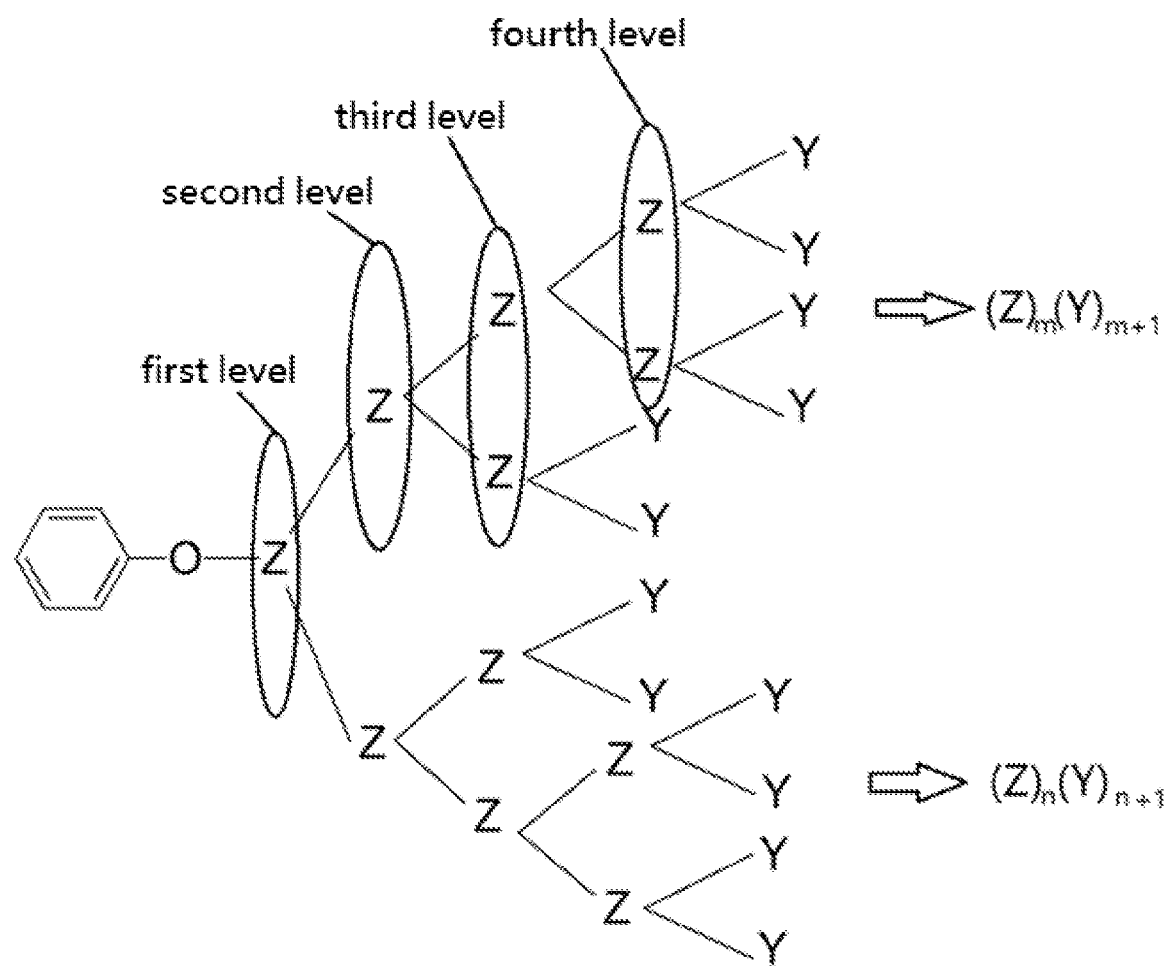
FIG. 1 illustrates the structure of a polyphenylene ether resin according to one embodiment of the present disclosure.
Figure 2A:
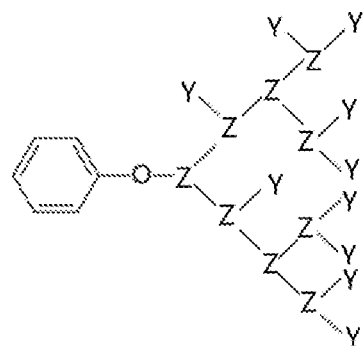
FIGS. 2A-2F illustrate the structures of polyphenylene ether resins according to some embodiments of the present disclosure.
Figure 2B:
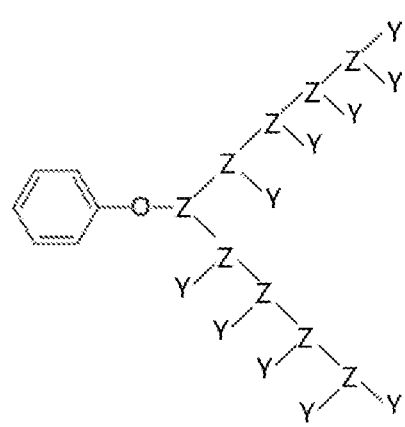
Figure 2C:
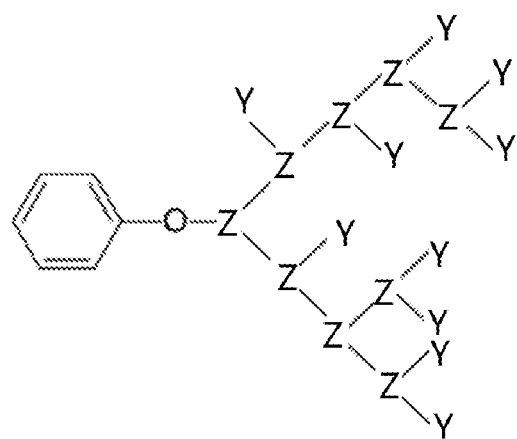
Figure 2D:
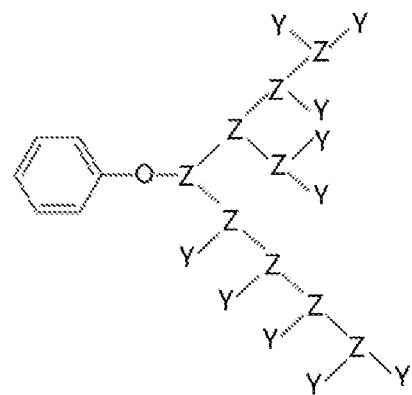
Figure 2E:
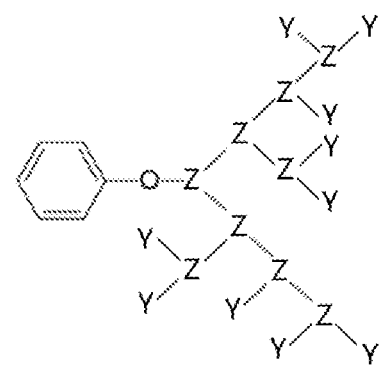
Figure 2F:
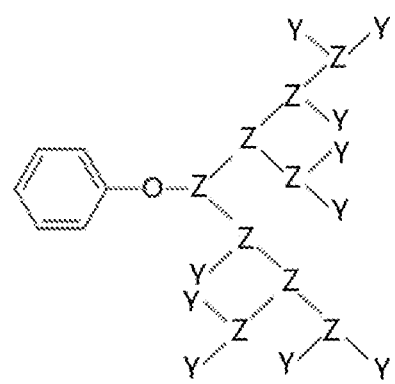

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, "or a combination thereof" means "or any combination thereof", and "any" means "any one", vice versa.

As used herein, the term "encompasses," "encompassing," "comprises," "comprising," "includes," "including," "has," "having" or any other variant thereof is construed as an open-ended transitional phrase intended to cover a non-exclusive inclusion. For example, a composition or manufacture that comprises a list of elements is not necessarily limited to only those elements but may include other elements not expressly listed or inherent to such composition or manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "encompasses," "encompassing," "comprises," "comprising," "includes," "including," "has," "having" or any other variant thereof, it is understood that close-ended transitional phrases such as "consisting of," "composed by" and "remainder being" and partially open-ended transitional phrases such as "consisting essentially of," "primarily consisting of," "mainly consisting of," "primarily containing," "composed essentially of," "essentially having," etc. are also disclosed and included.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of X1, X2 and X3," it is intended to disclose the situations of X is X1 and X is X1 and/or X2 and/or X3. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of X1, X2 and X3" and Y is described as being "selected from a group consisting of Y1, Y2 and Y3," the disclosure includes any combination of X is X1 and/or X2 and/or X3 and Y is Y1 and/or Y2 and/or Y3.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto. A homopolymer refers to the polymer formed by the polymerization of one monomer. Copolymers comprise: random copolymers, such as a structure of -AABABBBAAABBA-; alternating copolymers, such as a structure of -ABABABAB-; graft copolymers, such as a structure of -AA(A-BBBB)AA(A-BBBB)AAA-; and block copolymers, such as a structure of -AAAAA-BBBBBB-AAAAA-. For example, a styrene-butadiene copolymer disclosed herein is interpreted as comprising a styrene-butadiene random copolymer, a styrene-butadiene alternating copolymer, a styrene-butadiene graft copolymer, a styrene-butadiene block copolymer or a combination thereof. A prepolymer refers to a polymer having a lower molecular weight between the molecular weight of monomer and the molecular weight of final polymer, and a prepolymer contains a reactive functional group capable of participating further polymerization to obtain the final polymer product which has been fully crosslinked or cured. The term "polymer" includes but is not limited to an oligomer. An oligomer refers to a polymer with 2-20, typically 2-5, repeating units.

Unless otherwise specified, the term "resin" of the present disclosure is a widely used common name of a synthetic polymer and is construed as comprising monomer and its combination, polymer and its combination or a combination of monomer and its polymer, but not limited thereto.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from copolymerizing a resin and other resins, etc.

The unsaturated bond described herein, unless otherwise specified, refers to a reactive unsaturated bond, such as but not limited to an unsaturated double bond with the potential of being crosslinked with other functional groups, such as an unsaturated C=C double bond with the potential of being crosslinked with other functional groups, but not limited thereto.

The unsaturated C=C double bond as used herein preferably comprises, but not limited to, a vinyl group, a vinylbenzyl group, a (meth)acryloyl group, an allyl group or a combination thereof. The term "vinyl group" is construed as comprising a vinyl group and a vinylene group. The term "(meth)acryloyl group" is construed as comprising an acryloyl group and a methacryloyl group.

As used herein, "vinyl-containing" is interpreted as equivalent to containing an unsaturated C=C double bond.

Unless otherwise specified, an alkyl group and an alkenyl group described herein are construed to encompass various isomers thereof. For example, a propyl group is construed to encompass n-propyl and iso-propyl.

Unless otherwise specified, as used herein, part(s) by weight represents weight part(s) in any weight unit in the resin composition, such as but not limited to kilogram, gram, pound and so on. For example, 100 parts by weight of a hyperbranched polyphenylene ether resin may represent 100 kilograms of the hyperbranched polyphenylene ether resin or 100 pounds of the hyperbranched polyphenylene ether resin.

It should be understood that all features disclosed herein may be combined in any way to constitute the technical solution of the present disclosure, as long as there is no conflict present in the combination of these features.

Examples and embodiments are described in detail below. It will be understood that these examples and embodiments are exemplary only and are not intended to limit the scope and use of the present disclosure. Unless otherwise specified, processes, reagents and conditions described in the examples are those known in the art.

As described above, a main object of the present disclosure is to provide a resin composition, which comprises:

(A) a polyphenylene ether resin of Formula (1):

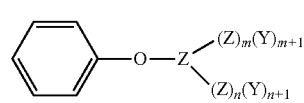

Formula (1)

wherein the Z group is a structure of Formula (2):

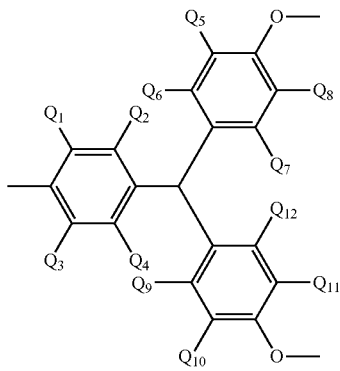

Formula (2)

in Formula (2), $Q_1$, $Q_2$, $Q_3$, $Q_4$, $Q_5$, $Q_6$, $Q_7$, $Q_8$, $Q_9$, $Q_{10}$, $Q_{11}$ and $Q_{12}$ are each independently hydrogen or a $C_1$-$C_6$ alkyl group;

the Y group is an unsaturated bond-containing end group;

$(Z)_m$ represents containing m Z groups (i.e., the number of Z groups is m), wherein each Z group is bonded via an ether bond to one to three adjacent Z groups and optionally to one or two Y groups, wherein the ether bond is from the Z group itself or from an adjacent Z group;

$(Z)_n$ represents containing n Z groups (i.e., the number of Z groups is n), wherein each Z group is bonded via an ether bond to one to three adjacent Z groups and optionally to one or two Y groups, wherein the ether bond is from the Z group itself or from an adjacent Z group;

$(Y)_{m+1}$ represents containing m+1 independent Y groups, each Y group being independently bonded via an ether bond to the Z group, wherein the ether bond is from the Z group adjacent to the Y group;

$(Y)_{n+1}$ represents containing n+1 independent Y groups, each Y group being independently bonded via an ether bond to the Z group, wherein the ether bond is from the Z group adjacent to the Y group;

m and n are independently a positive integer and $8 \leq m+n \leq 40$;

and (B) a compound of Formula (3), and/or a compound of Formula (4), and/or a compound of Formula (5):

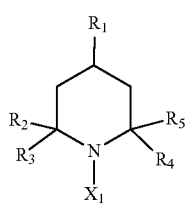

Formula (3)

in Formula (3), $X_1$ is an oxygen radical or a hydroxyl group, $R_2$ to $R_5$ each independently represent a hydrogen atom or a $C_1$-$C_5$ alkyl group, $R_2$ to $R_5$ are not a hydrogen atom at the same time, and $R_1$ is a hydrogen atom, a $C_1$-$C_5$ alkyl group, an amino group, a hydroxyl group, a carbonyl group or a carboxyl group;

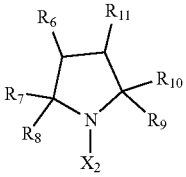

Formula (4)

in Formula (4), $X_2$ is an oxygen radical or a hydroxyl group, $R_7$ to $R_{10}$ each independently represent a hydrogen atom or a $C_1$-$C_5$ alkyl group, $R_7$ to $R_{10}$ are not a hydrogen atom at the same time, and $R_6$ and $R_{11}$ are independently a hydrogen atom, a $C_1$-$C_5$ alkyl group, an amino group, a hydroxyl group, a carbonyl group or a carboxyl group, or $R_6$, Ru and carbon atoms bonded thereto together define a benzene ring;

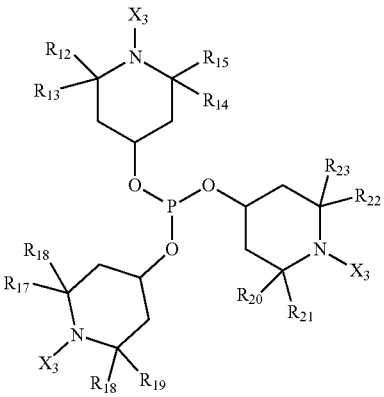

Formula (5)

in Formula (5), each X3 is independently an oxygen radical or a hydroxyl group, $R_{12}$ to $R_{23}$ each independently represent a hydrogen atom or a $C_1$-$C_5$ alkyl group, and $R_{12}$ to $R_{23}$ are not a hydrogen atom at the same time.

As used herein, the terms "polyphenylene ether resin of Formula (1)," "polyphenylene ether resin of the present disclosure," "hyperbranched polyphenylene ether resin" and "exemplary polyphenylene ether of Formula (1)" may be used interchangeably to refer to the aforesaid polyphenylene ether resin of Formula (1). When a polyphenylene ether resin different from the present invention is described, a different expression will be intentionally used for the purpose of distinguishing, such as "non-inventive polyphenylene ether resin," "different polyphenylene ether resin," "other polyphenylene ether resin," "other hyperbranched polyphenylene ether," "other branched polyphenylene ether resin," etc. According to some embodiments, the polyphenylene ether resin of the present disclosure may be used in the resin composition of the present disclosure and may also be used as necessary to other compositions, formulations, preparations or products and be beneficial to the improvements in technical performance from the resin composition according to the present disclosure.

According to the present disclosure, in Formula (1), $(Z)_m(Y)_{m+1}$ represents the presence of m Z groups and m+1 Y groups, wherein each Z group has a structure of Formula (2), including a covalent bond, as indicated by "1*", connected to the carbon atom of the benzene ring (abbreviated hereafter as "non-ether covalent bond of Z group", "non-ether bond covalent bond", "non-ether bond" or "1* bond"), and two ether bonds as indicated by "2*" and "3*".

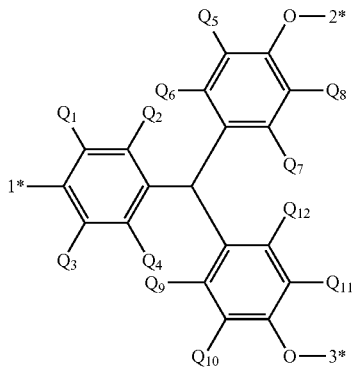

Formula (2)

The non-ether covalent bond of each Z group (1* bond) is connected to the ether bond of an adjacent Z group; the two ether bonds of each Z group ("2*" and "3*") may be connected to the non-ether bonds (1* bonds) from the other two Z groups, or the two ether bonds of each Z group ("2*" and "3*") may be connected, via covalent bond, to one Y group and another Z group (non-ether bond of said another Z group) or connected to two Y groups via covalent bonds respectively; two Y groups connected to the same Z group may be the same or different. In other words, each Z group in $(Z)_m(Y)_{m+1}$ may be covalently bonded to one Z group and two Y groups, to two Z groups and one Y group, or to three Z groups.

According to various embodiments of the present disclosure, in Formula (1), $(Z)_n(Y)_{n+1}$ represents the presence of n Z groups and n+1 Y groups, wherein the connections and types of each group may be referred from the descriptions of $(Z)_m(Y)_{m+1}$ above, and $(Z)_n(Y)_{n+1}$ may be the same as or different from $(Z)_m(Y)_{m+1}$.

In the present disclosure, for clarity and for a non-limiting purpose, "branching level", abbreviated hereafter as "level", is introduced to describe the structure of $(Z)_m(Y)_{m+1}$ and $(Z)_n(Y)_{n+1}$, and "degree of branching" is used to describe the overall branching of the polyphenylene ether resin of Formula (1). For example, FIG. 1 illustrates the structure of the polyphenylene ether resin of Formula (1) according to one embodiment of the present disclosure, in which respective structures of $(Z)_m(Y)_{m+1}$ and $(Z)_n(Y)_{n+1}$ are shown, m=5 and n=5. FIG. 1 illustrates the multi-level structure of $(Z)_m(Y)_{m+1}$, wherein the Z group connected to the phenyl ether bond at the left side is designated as the first level Z group; the two ether bonds of the first level Z group are respectively connected to the non-ether bond of one Z group from $(Z)_m(Y)_{m+1}$ and $(Z)_n(Y)_{n+1}$; the Z group in $(Z)_m(Y)_{m+1}$ and $(Z)_n(Y)_{n+1}$ in direct connection to the first level Z group is designated as the second level Z group, the Z group in direct connection to the second level Z group is designated as the third level Z group, the Z group in direct connection to the third level Z group is designated as the fourth level Z group, and so on and so forth. Each previous level Z group is connected, via its ether bonds, to the non-ether bonds of two next level Z groups, or to one Y group and the non-ether bond of one next level Z group, or to two Y groups. According to the present disclosure, "degree of branching" is represented by the value of "m+n" to reflect the total amount of Z groups connected in $(Z)_m(Y)_{m+1}$ and $(Z)_n(Y)_{n+1}$, so as to indicate the branching degree of the polyphenylene ether resin of the present disclosure on the whole.

According to one embodiment of the present disclosure, each m and n respectively represent a positive integer, such as a positive integer from 1 to 39. For example, each m and n respectively represent a positive integer within the scope defined by a combination of any two numbers below: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, and 39, wherein 8≤m+n≤40, such as m+n being within the scope defined by a combination of any two numbers below: 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40. According to a preferred embodiment of the present disclosure, m is 3 and n is 5, 6, 8, 20 or 25. According to another preferred embodiment of the present disclosure, m is 4 and n is 5, 6, 8, 20 or 25. According to another preferred embodiment of the present disclosure, m is 10 and n is 5, 6, 8, 20 or 25. According to another preferred embodiment of the present disclosure, m is 15 and n is 5, 6, 8, 20 or 25. Table 1 and Table 2 below show the total numbers of Z groups and Y groups respectively corresponding to each m and n in the exemplary polyphenylene ether of Formula (1) of the present disclosure.

TABLE 1

The total number of Z groups corresponding to each m and n in the exemplary polyphenylene ether of Formula (1) of the present disclosure (total number of Z = m + n + 1)

| | n | | | | |
|---|---|---|---|---|---|
| m | 5 | 6 | 8 | 20 | 25 |
| 3 | 9 | 10 | 12 | 24 | 29 |
| 4 | 10 | 11 | 13 | 25 | 30 |
| 10 | 16 | 17 | 19 | 31 | 36 |
| 15 | 21 | 22 | 24 | 36 | 41 |

TABLE 2

The total number of Y groups corresponding to each m and n in the exemplary polyphenylene ether of Formula (1) of the present disclosure (total number of Y = m + n + 2)

| | n | | | | |
|---|---|---|---|---|---|
| m | 5 | 6 | 8 | 20 | 25 |
| 3 | 10 | 11 | 13 | 25 | 30 |
| 4 | 11 | 12 | 14 | 26 | 31 |
| 10 | 17 | 18 | 20 | 32 | 37 |
| 15 | 22 | 23 | 25 | 37 | 42 |

According to one embodiment of the present disclosure, when the polyphenylene ether resin of the present disclosure is described as "having a specific value of m+n", it is intended to encompass a mixture of various polyphenylene ethers having different connection forms in which the total number of Z groups in $(Z)_m(Y)_{m+1}$ and $(Z)_n(Y)_{n+1}$ satisfies the specific value (i.e., isomers having an identical molecular formula but distinct arrangements of groups) and is not limited to one specific type of isomer. For example, FIG. 2A to FIG. 2F show, in a non-exhaustive and exemplary way, six different isomers having the same degree of branching (m+n=8), but many other isomers having the same degree of branching (m+n=8) may be included. For example, in FIG. 2A to FIG. 2F, m is equal to n in all illustrated isomers, but isomers with m>n or m<n may also be included. In the present disclosure, when the polyphenylene ether resin is described with "m+n=8", it is construed that the polyphenylene ether resin may encompass the isomers in FIGS. 2A-2F and any one of various isomers with a degree of branching of 8, used alone or as a combination of two or more or as a mixture of all isomers. The presence and relative amount of each isomer is determined according to the raw materials, catalysts, reaction conditions and reaction time used. When "m+n" is equal to other values, it is construed that the polyphenylene ether resin may encompass all isomers with the same amount of Z groups, used alone or as a combination of two or more or as a mixture of all isomers, wherein the structure of each isomer may be envisioned according to the respective valence of Z and Y groups by reference to the illustration in FIGS. 2A-2F.

According to one embodiment of the present disclosure, in Formula (2), each atom or atom group directly bonded to a benzene ring, i.e., $Q_1$, $Q_2$, $Q_3$, $Q_4$, $Q_5$, $Q_6$, $Q_7$, $Q_8$, $Q_9$, $Q_{10}$, $Q_{11}$ and $Q_{12}$, is independently hydrogen or a $C_1$-$C_6$ alkyl group, such as comprising any one or more of the following: hydrogen, methyl, ethyl, n-propyl, isopropyl, n-butyl, isobutyl, sec-butyl, tert-butyl, n-pentyl, isopentyl, neopentyl, n-hexyl, isohexyl, 3-methylpentyl, 2,2-dimethylbutyl, 2,3-dimethylbutyl, etc. According to one embodiment of the present disclosure, $Q_1$, $Q_2$, $Q_3$, $Q_4$, $Q_5$, $Q_6$, $Q_7$, $Q_8$, $Q_9$, $Q_{10}$, $Q_{11}$ and $Q_{12}$ are all hydrogen. According to another embodiment of the present disclosure, one, two, three, four, five or six of $Q_1$, $Q_2$, $Q_3$, $Q_4$, $Q_5$, $Q_6$, $Q_7$, $Q_8$, $Q_9$, $Q_{10}$, $Q_{11}$ and $Q_{12}$ are methyl and the rest are hydrogen.

According to one embodiment of the present disclosure, in the polyphenylene ether resin of Formula (1), each Y group independently represents an unsaturated bond-containing end group, which comprises one or more of the following: $C_2$-$C_6$ alkenylbenzyl group, (meth)acryloyl group, phenylacryloyl group, fluorine-containing phenylacryloyl group and fluorine-containing $C_1$-$C_6$ alkylphenylacryloyl group. According to one embodiment of the present disclosure, in the polyphenylene ether resin of Formula (1), all Y groups are a $C_2$-$C_6$ alkenylbenzyl group, such as a vinylbenzyl group. According to one embodiment of the present disclosure, in the polyphenylene ether resin of Formula (1), all Y groups are an acryloyl group. According to one embodiment of the present disclosure, in the polyphenylene ether resin of Formula (1), all Y groups are a methacryloyl group. According to one embodiment of the present disclosure, in the polyphenylene ether resin of Formula (1), all Y groups are a phenylacryloyl group. According to one embodiment of the present disclosure, in the polyphenylene ether resin of Formula (1), all Y groups are a fluorine-containing phenylacryloyl group. According to one embodiment of the present disclosure, in the polyphenylene ether resin of Formula (1), all Y groups are a fluorine-containing $C_1$-$C_6$ alkylphenylacryloyl group, such as a trifluoromethylphenylacryloyl group. According to one embodiment of the present disclosure, in the polyphenylene ether resin of Formula (1), the Y groups are selected from two or more of the following groups: $C_2$-$C_6$ alkenylbenzyl group, (meth)acryloyl group, phenylacryloyl group, fluorine-containing phenylacryloyl group and fluorine-containing $C_1$-$C_6$ alkylphenylacryloyl group.

According to one embodiment of the present disclosure, the polyphenylene ether resin of Formula (1) comprises a polyphenylene ether resin of Formula (6), a polyphenylene ether resin of Formula (7), a polyphenylene ether resin of Formula (8) or a combination thereof.

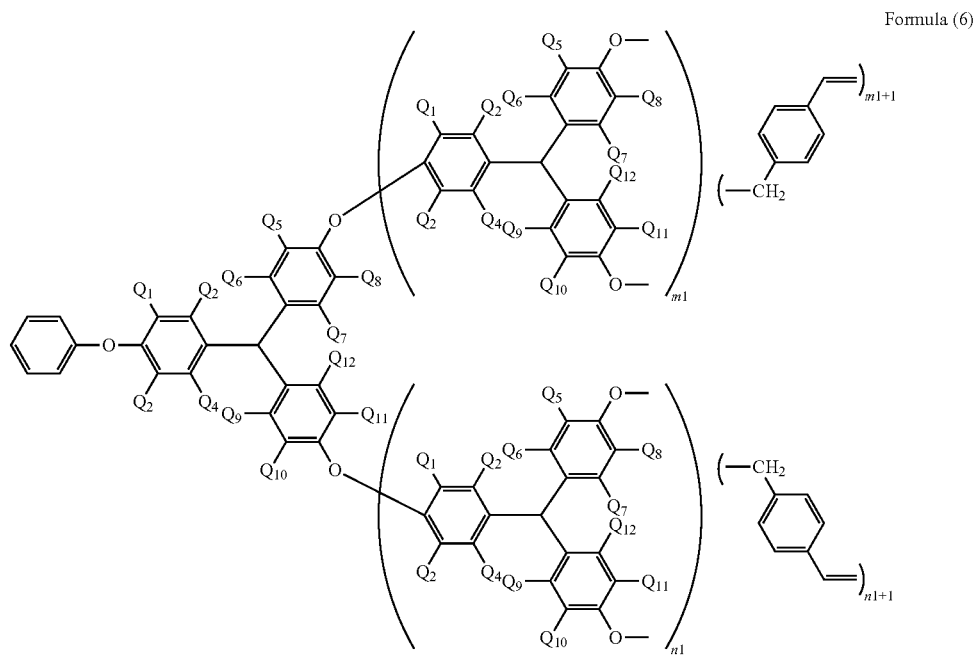

Formula (6)

in Formula (6), m1 and n1 are independently a positive integer and $10 \leq m1+n1 \leq 35$;

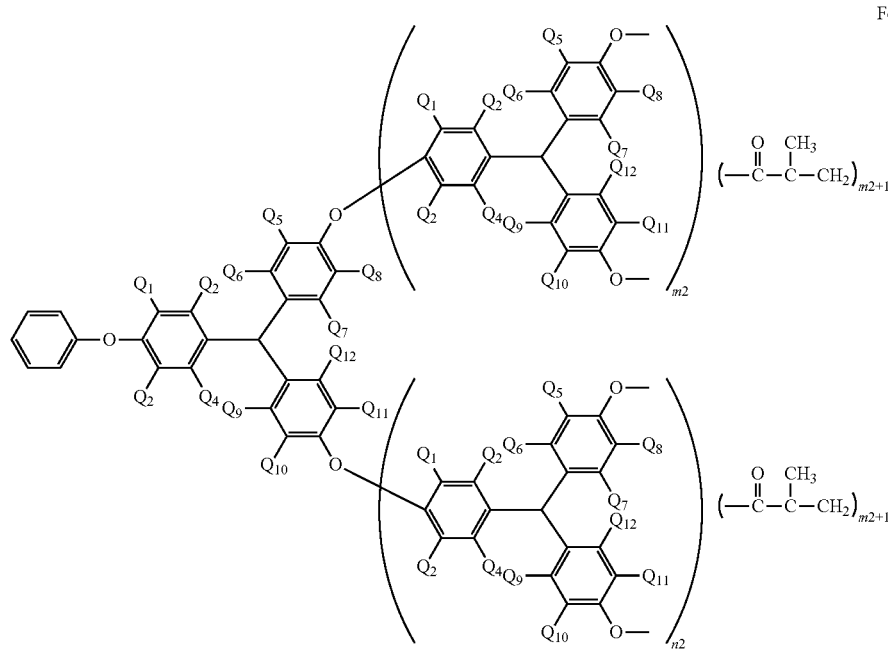

Formula (7)

in Formula (7), m2 and n2 are independently a positive integer and $10 \leq m2+n2 \leq 35$;

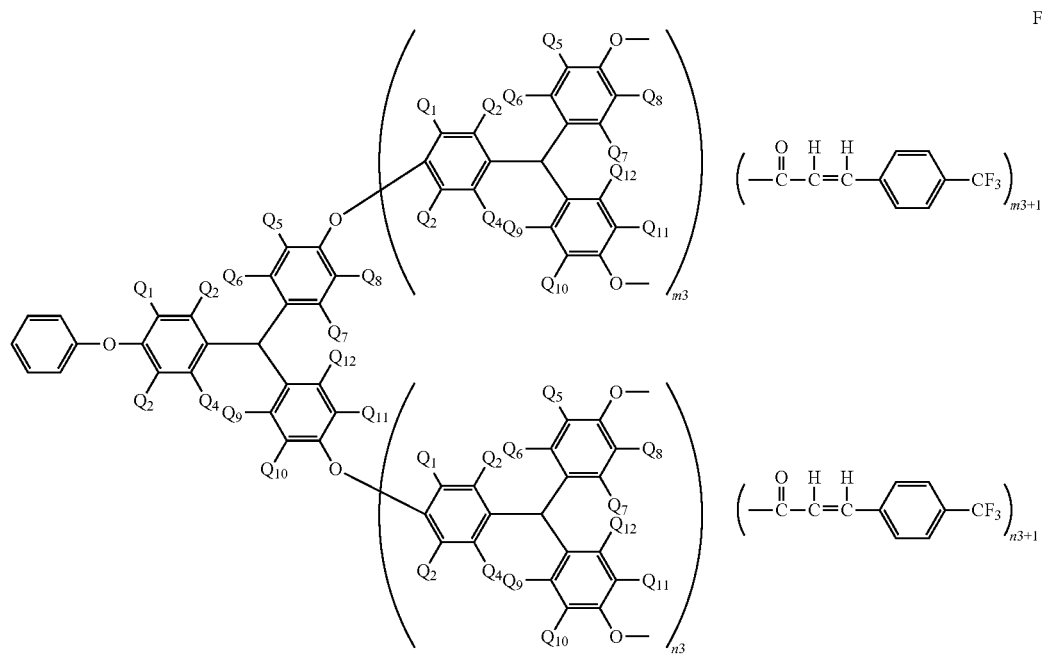

Formula (8)

in Formula (8), m3 and n3 are independently a positive integer and $10 \leq m3+n3 \leq 35$.

As shown in Formula (6), Formula (7) and Formula (8), corresponding to Formula (1), the Z groups (i.e., the structure of Formula (2)) are illustrated and the structures of Y groups are illustrated. In Formula (6), Formula (7) and Formula (8), substituents of the Z groups, i.e., $Q_1$, $Q_2$, $Q_3$, $Q_4$, $Q_5$, $Q_6$, $Q_7$, $Q_8$, $Q_9$, $Q_{10}$, $Q_{11}$ and $Q_{12}$, are as defined above in the descriptions of Z groups having the structure of Formula (2). In Formula (6), the Y groups are a vinylbenzyl group; in Formula (7), the Y groups are a methacryloyl group; and in Formula (8), the Y groups are a trifluoromethylphenylacryloyl group. m1 and n1 in Formula (6), m2 and n2 in Formula (7), and m3 and n3 in Formula (8) respectively represent the amount of Z groups in the respective parentheses, as can be referred from the descriptions of m and n above. In addition, in Formula (6), Formula (7) and Formula (8), the connections between Z groups and between Z groups and Y groups are not shown, which means that for Formula (6), Formula (7) and Formula (8), each previous level Z group in the parentheses is connected, via its ether bonds, to the non-ether bonds of two next level Z groups, or to one Y group and the non-ether bond of one next level Z group, or to two Y groups, as can be referred from the descriptions of connection in $(Z)_m(Y)_{m+1}$ and $(Z)_n(Y)_{n+1}$.

In an exemplary and non-limiting embodiment of the present disclosure, the polyphenylene ether resin of the present disclosure has an a value of 0.30-0.42, such as a value in the scope defined by any two of the following as the endpoints: 0.30, 0.31, 0.32, 0.33, 0.34, 0.35, 0.36, 0.37, 0.38, 0.39, 0.41 and 0.42. The a value of the present disclosure is the parameter a in the Mark-Houwink equation used to characterize the relationship between intrinsic viscosity and molecular weight of polymers. The a value may be used to characterize the shape of a polymer. In a benign solution, a hyperbranched polymer has an a value of 0.3-0.5, and the polyphenylene ether resin of Formula (1) of the present disclosure has an α value of 0.30-0.42, indicating that the polyphenylene ether resin of Formula (1) of the present disclosure has a hyperbranched structure. According to the present disclosure, unless otherwise specified, the α value of a hyperbranched polyphenylene ether may be measured by using a conventional instrument, such as but not limited to a triple-detector size exclusion chromatography (TD-SEC) system from the Waters Corporation, wherein the TD-SEC system includes a 2414 refractive index detector (DRI), a Wyatt TRI STAR mini DAWN multi-angle laser detector (MALLS) and a viscosity detector (DP).

Not bound by any specific theory, the present disclosure may also use Formula (9) and Formula (10) below to define the polyphenylene ether resin of the present disclosure.

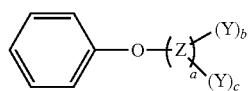

Formula (9)

in Formula (9), the Z group (or "Z" for short) is the structure of Formula (2):

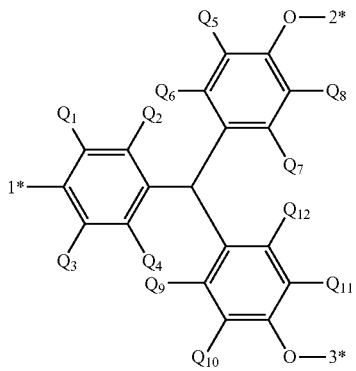

Formula (2)

in Formula (2), $Q_1$, $Q_2$, $Q_3$, $Q_4$, $Q_5$, $Q_6$, $Q_7$, $Q_8$, $Q_9$, $Q_{10}$, $Q_{11}$ and $Q_{12}$ are each independently hydrogen or a $C_1$-$C_6$ alkyl group;

the Y group (or "Y" for short) is an unsaturated bond-containing end group;

a is the amount of Z in Formula (9), b+c is the amount of Y connected to Z, a, b and c are individually a positive integer, 9≤a≤41, and a+1=b+c.

The groups in the structure of Formula (9) are connected according to the following configuration: the non-ether covalent bond of each Z group (1* bond) is connected to the ether bond of an adjacent Z group; the two ether bonds of each Z group ("2*" and "3*") may be connected to the non-ether bonds (1* bonds) from the other two Z groups, or the two ether bonds of each Z group ("2*" and "3*") may be connected, via covalent bond, to one Y group and another Z group (non-ether bond of said another Z group) or connected to two Y groups via covalent bonds respectively; two Y groups connected to the same Z group may be the same or different. In other words, each Z group may be covalently bonded to one Z group and two Y groups, to two Z groups and one Y group, or to three Z groups.

According to one embodiment of the present disclosure, a represents a positive integer, such as a positive integer from 9 to 41. For example, a may be a positive integer within the scope defined by a combination of any two numbers below: 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, and 41, wherein a+1=b+c, that is, b+c is within the scope of 10 to 42 and satisfies the equation above; for example, b+c may be within the scope defined by a combination of any two numbers below: 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, and 42; b and c respectively represent a positive integer from 1 to 41, such as a positive integer within the scope defined by a combination of any two numbers below: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, and 41.

It should be emphasized that, in Formula (9) above, while the connection between $(Z)_a$, $(Y)_b$ and $(Y)_c$ is illustrated by a straight line to represent a covalent bond, it should not be wrongly construed that $(Z)_a$ contains only one Z group and that the Z group is directly connected to one $(Y)_b$ and one $(Y)_c$; the connections between Z groups and between Z groups and Y groups are as described above.

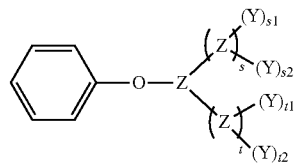

Formula (10)

in Formula (10), the Z group (or "Z" for short) is the structure of Formula (2):

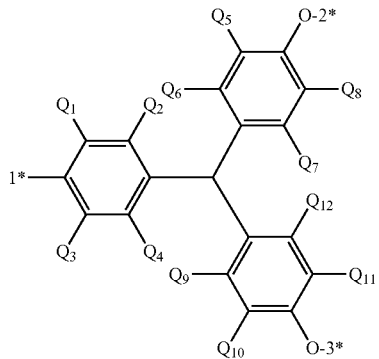

Formula (2)

in Formula (2), $Q_1$, $Q_2$, $Q_3$, $Q_4$, $Q_5$, $Q_6$, $Q_7$, $Q_8$, $Q_9$, $Q_{10}$, $Q_{11}$ and $Q_{12}$ are each independently hydrogen or a $C_1$-$C_6$ alkyl group;

the Y group (or "Y" for short) is an unsaturated bond-containing end group;

s is the amount of Z in (Z)s, t is the amount of Z in (Z)t, and each s and t respectively represent a positive integer, such as a positive integer from 1 to 39. For example, each s and t respectively represent a positive integer within the scope defined by a combination of any two numbers below: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, and 39, wherein 8≤s+t≤40, such as s+t being within the scope defined by a combination of any two numbers below: 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40·s1+s2 represents the total amount of Y connected to Z in $(Z)_s$, and s1+s2=s+1; t1+t2 represents the total amount of Y connected to Z in $(Z)_t$, and t1+t2=t+1; therefore, s1+s2+t1+t2=s+t+2. According to one embodiment of the present disclosure, each of s1, s2, t1 and t2 respectively represents a positive integer from 1 to 39, such as a positive integer within the scope defined by a combination of any two numbers below: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, and 39. And 10≤s1+s2+t1+t2≤42.

The groups in the structure of Formula (10) are connected according to the following configuration: the non-ether covalent bond of each Z group (1* bond) is connected to the ether bond of an adjacent Z group; the two ether bonds of each Z group ("2*" and "3*") may be connected to the non-ether bonds (1* bonds) from the other two Z groups, or the two ether bonds of each Z group ("2*" and "3*") may be connected, via covalent bond, to one Y group and another Z group (non-ether bond of said another Z group) or connected to two Y groups via covalent bonds respectively; two Y groups connected to the same Z group may be the same or different. In other words, each Z group may be covalently bonded to one Z group and two Y groups, to two Z groups and one Y group, or to three Z groups.

It should be emphasized that, in Formula (10) above, while the connection between $(Z)_s$, $(Z)_t$, $(Y)_{s1}$, $(Y)_{s2}$, $(Y)_{t1}$ and $(Y)_{t2}$ is illustrated by a straight line to represent a covalent bond, it should not be wrongly construed that $(Z)_s$ contains only one Z group and that the Z group is directly connected to one $(Y)_{s1}$ and one $(Y)_{s2}$; the connections between Z groups and between Z groups and Y groups are as described above.

As described above, Formula (9) and Formula (10) are used equivalently to Formula (1) to define the polyphenylene ether resin of the present disclosure, and the three formulas may be used interchangeably to define the structure, the degree of branching and the like of the polyphenylene ether resin of the present disclosure.

According to one embodiment of the present disclosure, the composition comprises a compound of Formula (3), and/or a compound of Formula (4), and/or a compound of Formula (5):

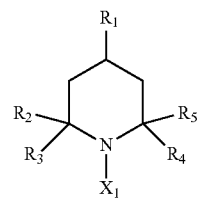

Formula (3)

in Formula (3), $X_1$ is an oxygen radical or a hydroxyl group, $R_2$ to $R_5$ each independently represent a hydrogen atom or a $C_1$-$C_5$ alkyl group, $R_2$ to $R_5$ are not a hydrogen atom at the same time, and $R_1$ is a hydrogen atom, a $C_1$-$C_5$ alkyl group, an amino group, a hydroxyl group, a carbonyl group or a carboxyl group;

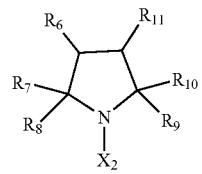

Formula (4)

in Formula (4), $X_2$ is an oxygen radical or a hydroxyl group, $R_7$ to $R_{10}$ each independently represent a hydrogen atom or a $C_1$-$C_5$ alkyl group, $R_7$ to $R_{10}$ are not a hydrogen atom at the same time, and $R_6$ and Ru are independently a hydrogen atom, a C1-$C_5$ alkyl group, an amino group, a hydroxyl group, a carbonyl group or a carboxyl group, or $R_6$, Ru and carbon atoms bonded thereto together define a benzene ring;

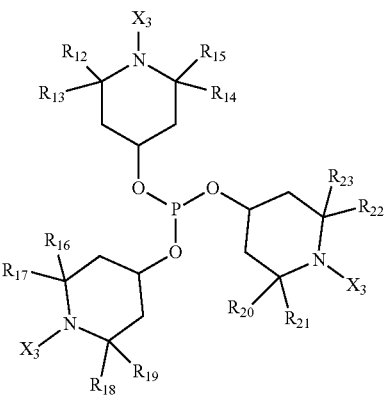

Formula (5)

in Formula (5), each $X_3$ is independently an oxygen radical or a hydroxyl group, $R_{12}$ to $R_{23}$ each independently represent a hydrogen atom or a $C_1$-$C_5$ alkyl group, and $R_{12}$ to $R_{23}$ are not a hydrogen atom at the same time.

For example, in one embodiment, the compound of Formula (3) comprises a compound of any one of Formula (11) to Formula (15) or a combination thereof:

Formula (11)
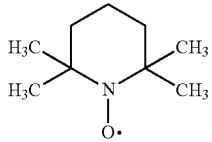

Formula (12)
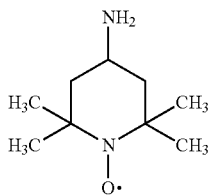

Formula (13)
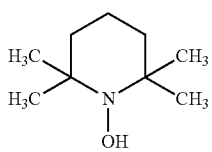

Formula (14)
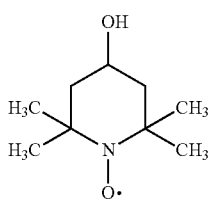

Formula (15)
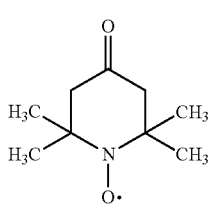

In one embodiment, the compound of Formula (4) comprises a compound of any one of Formula (16) to Formula (19) or a combination thereof:

Formula (16)
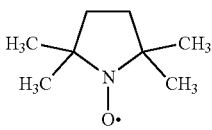

Formula (17)
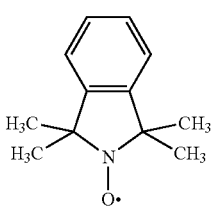

Formula (18)
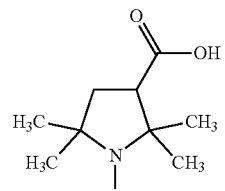

Formula (19)
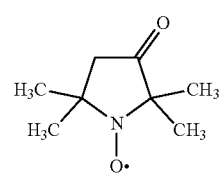

In one embodiment, the compound of Formula (5) comprises a compound of any one of Formula (20) to Formula (21) or a combination thereof.

Formula (20)
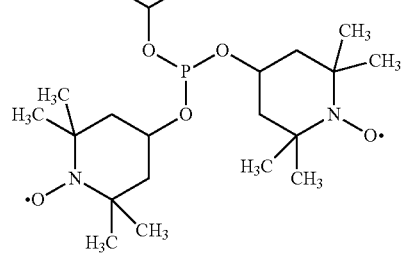

Formula (21)
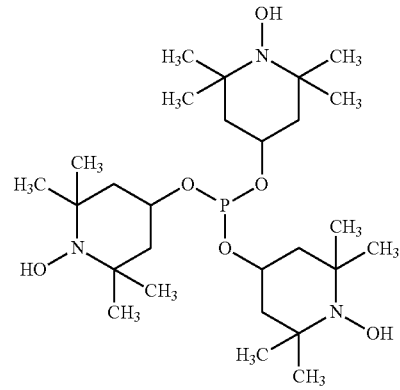

According to one embodiment of the present disclosure, the resin composition according to the present disclosure comprises, based on a total of 100 parts by weight of the polyphenylene ether resin of Formula (1), 0.005 to 3 parts by weight, such as 0.008 to 2 parts by weight, of the compound of Formula (3). According to one embodiment of the present disclosure, the resin composition according to the present disclosure comprises, based on a total of 100 parts by weight of the polyphenylene ether resin of Formula (1), 0.005 to 3 parts by weight, such as 0.008 to 2 parts by weight, of the compound of Formula (4). According to one embodiment of the present disclosure, the resin composition according to the present disclosure comprises, based on a total of 100 parts by weight of the polyphenylene ether resin of Formula (1), 0.005 to 3 parts by weight, such as 0.008 to 2 parts by weight, of the compound of Formula (5). According to one embodiment of the present disclosure, the resin composition of the present disclosure contains any combination (i.e., a mixture) of Formula (3), Formula (4) and Formula (5), and based on a total of 100 parts by weight of the polyphenylene ether resin of Formula (1), the amount of the mixture is 0.005 to 3 parts by weight, such as 0.005 to 2.5 parts by weight. According to one embodiment of the present disclosure, based on a total of 100 parts by weight of the polyphenylene ether resin of Formula (1), the respective amounts, when used alone, or the total amount, when used as a combination, of the compounds of Formulas (3) to (5) may be within the scope defined by a combination of any two numbers below: 0.005, 0.006, 0.007, 0.008, 0.01, 0.012, 0.015, 0.02, 0.025, 0.03, 0.035, 0.04, 0.045, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, and 3 parts by weight.

In the resin composition of the present disclosure, the compound of Formula (3) preferably comprises a compound of any one of Formula (11) to Formula (15) or a combination thereof, but not limited thereto. Unless otherwise specified, in Formula (3), the oxygen radical at the position $X_1$ and the hydroxyl group at the position $X_1$ are chemically equivalent. For example, the structure of Formula (11) and the structure of Formula (13) are equivalent to each other; that is, the structure of Formula (11) may be present as the structure of Formula (13), and the structure of Formula (13) may be present as the structure of Formula (11).

In another aspect, in the resin composition of the present disclosure, the compound of Formula (4) preferably comprises a compound of any one of Formula (16) to Formula (19) or a combination thereof, but not limited thereto. Similarly, unless otherwise specified, in Formula (4), the oxygen radical at the position $X_2$ and the hydroxyl group at the position $X_2$ are chemically equivalent.

In another aspect, in the resin composition of the present disclosure, the compound of Formula (5) preferably comprises a compound of any one of Formula (20) to Formula (21) or a combination thereof, but not limited thereto. Similarly, unless otherwise specified, in Formula (5), the oxygen radical and the hydroxyl group at the position $X_3$ are chemically equivalent. For example, the structure of Formula (20) and the structure of Formula (21) are equivalent to each other; that is, the structure of Formula (20) may be present as the structure of Formula (21), and the structure of Formula (21) may be present as the structure of Formula (20).

In other words, as used herein, unless otherwise specified, to the compound of Formula (3), the compound of Formula (4) or the compound of Formula (5), any disclosure of embodiment or chemical structure of $X_1$ to $X_3$ being an oxygen radical is considered as the disclosure of embodiment or chemical structure of $X_1$ to $X_3$ being a hydroxyl group. For example, whenever the structure of Formula (11) is disclosed herein, it is construed as the disclosure of the structure of Formula (13), vice versa.

The vinyl-containing crosslinking agent used in the present disclosure is not particularly limited and may include any one or more vinyl-containing crosslinking agents useful for making a prepreg, a resin film, a laminate, or a printed circuit board.

For example, but not limited thereto, the vinyl-containing crosslinking agent comprises 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate or a combination thereof; it may also comprise a derivative of the vinyl-containing crosslinking agent, such as those being independently substituted by the substituents including: fluorine, $C_1$-$C_6$ alkyl group, $C_1$-$C_6$ alkoxy group, $C_2$-$C_8$ alkenyl group, C6-C12 aralkyl group, and $C_6$-$C_{12}$ heteroaryl group. The vinyl-containing crosslinking agent is construed as comprising all its isomers. According to one embodiment of the present disclosure, based on a total of 100 parts by weight of the polyphenylene ether resin of Formula (1), the amount of the vinyl-containing crosslinking agent or its derivative is 20-70 parts by weight, such as 20-65 parts by weight or 20-40 parts by weight or within the scope defined by a combination of any two numbers below: 20, 22, 25, 28, 30, 32, 35, 38, 40, 42, 45, 48, 50, 52, 55, 60, 62, 65, 68, and 70 parts by weight. The vinyl-containing crosslinking agent disclosed herein may also comprise a prepolymer of the vinyl-containing crosslinking agent, such as a triallyl isocyanurate prepolymer, a t-butyl styrene prepolymer, and a divinylbenzene prepolymer. Examples include, but not limited to, a prepolymer of triallyl isocyanurate and divinylbenzene, a prepolymer of divinylbenzene and styrene, a prepolymer of ethylvinylbenzene, divinylbenzene and styrene.

According to one embodiment of the present disclosure, the resin composition of the present disclosure may further comprise one or more of the following: a benzoxazine resin, an epoxy resin, a polyester resin, a phenolic resin, a polyamide resin, a polyolefin, a styrene maleic anhydride, a maleimide resin, an organic silicone resin, a cyanate ester resin, and a maleimide triazine resin.

Examples of the benzoxazine resin suitable for the present disclosure are not particularly limited and may comprise various benzoxazine resins known in the art to which this disclosure pertains; examples include but are not limited to bisphenol A benzoxazine resin, bisphenol F benzoxazine resin, phenolphthalein benzoxazine resin, dicyclopentadiene benzoxazine resin, phosphorus-containing benzoxazine resin, diamino benzoxazine resin, vinyl-containing benzoxazine resin, or a combination thereof. The diamino benzoxazine resin may include oxydianiline benzoxazine resin, diamino bisphenol F benzoxazine resin, diamino diphenyl benzoxazine resin, or a combination thereof. For example, the benzoxazine resin may be, but not limited to, LZ-8270, LZ-8280, LZ-8290 or LPY 11051 available from Huntsman, PF-3500 available from Chang Chun Plastics or HFB-2006M available from Showa High Polymer.

According to one embodiment of the present disclosure, the amount of the benzoxazine resin used in the present disclosure may be adjusted as needed; for example, but not limited thereto, in the resin composition of the present disclosure, based on a total of 100 parts by weight of the polyphenylene ether resin of Formula (1), the amount of the benzoxazine resin may be 5 to 100 parts by weight, such as within the scope defined by a combination of any two amounts below: 5 parts by weight, 10 parts by weight, 15 parts by weight, 20 parts by weight, 25 parts by weight, 30 parts by weight, 35 parts by weight, 40 parts by weight, 45 parts by weight, 50 parts by weight, 55 parts by weight, 60 parts by weight, 65 parts by weight, 70 parts by weight, 75 parts by weight, 80 parts by weight, 85 parts by weight, 90 parts by weight, 95 parts by weight, and 100 parts by weight.

According to one embodiment of the present disclosure, for example, the epoxy resin may be any epoxy resin known in the field to which this disclosure pertains; in terms of improving the thermal resistance of the resin composition, the epoxy resin may include, but not limited to, bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional novolac epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may be one or two or more selected from DOPO-containing phenol novolac epoxy resin, DOPO-containing o-cresol novolac epoxy resin and DOPO-containing bisphenol A novolac epoxy resin; the DOPO-HQ epoxy resin may be one or two or more selected from DOPO-HQ-containing phenol novolac epoxy resin, DOPO-HQ-containing o-cresol novolac epoxy resin and DOPO-HQ-containing bisphenol A novolac epoxy resin, but not limited thereto.

According to one embodiment of the present disclosure, the amount of the epoxy resin used in the present disclosure may be adjusted as needed; for example, but not limited thereto, in the resin composition of the present disclosure, based on a total of 100 parts by weight of the polyphenylene ether resin of Formula (1), the amount of the epoxy resin may be 5 to 100 parts by weight, such as within the scope defined by a combination of any two amounts below: 5 parts by weight, 10 parts by weight, 15 parts by weight, 20 parts by weight, 25 parts by weight, 30 parts by weight, 35 parts by weight, 40 parts by weight, 45 parts by weight, 50 parts by weight, 55 parts by weight, 60 parts by weight, 65 parts by weight, 70 parts by weight, 75 parts by weight, 80 parts by weight, 85 parts by weight, 90 parts by weight, 95 parts by weight, and 100 parts by weight.

According to one embodiment of the present disclosure, for example, the polyester resin may be any polyester known in the field to which this disclosure pertains. Examples include but are not limited to a dicyclopentadiene-containing polyester and a naphthalene-containing polyester. Examples include, but not limited to, HPC-8000 or HPC-8150 available from D.I.C. Corporation. For example, in the resin composition of the present disclosure, based on a total of 100 parts by weight of the polyphenylene ether resin of Formula (1), the amount of the polyester resin is 10 to 80 parts by weight, such as within the scope defined by a combination of any two amounts below: 10 parts by weight, 15 parts by weight, 20 parts by weight, 25 parts by weight, 30 parts by weight, 35 parts by weight, 40 parts by weight, 45 parts by weight, 50 parts by weight, 55 parts by weight, 60 parts by weight, 65 parts by weight, 70 parts by weight, 75 parts by weight, and 80 parts by weight.

According to the present disclosure, for example, the phenolic resin may be any phenolic resin known in the field to which this disclosure pertains, examples including but not limited to phenoxy resin or novolac resin (such as phenol novolac resin, naphthol novolac resin, biphenyl novolac resin, and dicyclopentadiene phenol resin), but not limited thereto. For example, in the resin composition of the present disclosure, based on a total of 100 parts by weight of the polyphenylene ether resin of Formula (1), the amount of the phenolic resin is 1 to 50 parts by weight, such as within the scope defined by a combination of any two amounts below: 1 part by weight, 4 parts by weight, 7.5 parts by weight, 10 parts by weight, 1012 parts by weight, 15 parts by weight, 20 parts by weight, 25 parts by weight, 30 parts by weight, 35 parts by weight, 40 parts by weight, 45 parts by weight, and 50 parts by weight.

According to one embodiment of the present disclosure, for example, the polyamide resin described herein may be any polyamide resin known in the field to which this disclosure pertains, including but not limited to various commercially available polyamide resin products.

According to one embodiment of the present disclosure, for example, the polyimide resin described herein may be any polyimide resin known in the field to which this disclosure pertains, including but not limited to various commercially available polyimide resin products.

According to the present disclosure, the polyolefin used herein is not particularly limited and may comprise various olefin polymers known in the art to which this disclosure pertains, such as but not limited to polybutadiene, polyisoprene, styrene-butadiene copolymer, styrene-isoprene copolymer, styrene-butadiene-divinylbenzene terpolymer, styrene-butadiene-maleic anhydride terpolymer, vinyl-polybutadiene-urethane oligomer, maleic anhydride-butadiene copolymer, polymethylstyrene, hydrogenated polybutadiene, hydrogenated styrene-butadiene-divinylbenzene terpolymer, hydrogenated styrene-butadiene-maleic anhydride terpolymer, hydrogenated styrene-butadiene copolymer, hydrogenated styrene-isoprene copolymer or a combination thereof. Unless otherwise specified, the amount of polyolefin used in the present disclosure may be adjusted as needed; for example, but not limited thereto, relative to 100 parts by weight of the polyphenylene ether resin of Formula (1), the amount of polyolefin may be 15 to 50 parts by weight, such as 15 parts by weight, 18 parts by weight, 25 parts by weight, 35 parts by weight, 40 parts by weight or 50 parts by weight.

In some embodiments, the styrene-butadiene copolymer is preferably a styrene-butadiene random copolymer.

In some embodiments, the hydrogenated styrene-butadiene copolymer is preferably a hydrogenated styrene-butadiene block copolymer, examples including but not limited to a hydrogenated styrene-butadiene diblock copolymer or a hydrogenated styrene-butadiene-styrene triblock copolymer (SEBS).

In some embodiments, the polyolefin preferably uses polybutadiene B-3000 available from Nippon Soda.

According to one embodiment of the present disclosure, for example, the styrene maleic anhydride may be any styrene maleic anhydride known in the field to which this disclosure pertains, wherein the ratio of styrene (S) to maleic anhydride (MA) may be for example 1/1, 2/1, 3/1, 4/1, 6/1, 8/1 or 12/1, examples including styrene maleic anhydride copolymers such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope, but not limited thereto.

The maleimide resin suitable for the present disclosure is not particularly limited and may include any one or more maleimide resins useful for preparing a prepreg, a resin film, a laminate or a printed circuit board. In some embodiments, the maleimide resin may comprise 4,4'-diphenylmethane bismaleimide, polyphenylmethane maleimide (a.k.a. oligomer of phenylmethane maleimide), bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, vinyl benzyl maleimide (VBM), maleimide resin containing aliphatic long chain structure, prepolymer of diallyl compound and maleimide resin, prepolymer of diamine and maleimide resin, prepolymer of multi-functional amine and maleimide resin, prepolymer of acid phenol compound and maleimide resin, or a combination thereof. These components should be construed as including their modifications.

For example, the maleimide resin may include products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI-7000H available from Daiwakasei Industry Co., Ltd., or products such as BMI-70 and BMI-80 available from K.I Chemical Industry Co., Ltd.

For example, the maleimide resin containing aliphatic long chain structure may include products such as BMI-689, BMI-1400, BMI-1500, BMI-1700, BMI-2500, BMI-3000, BMI-5000 and BMI-6000 available from Designer Molecules Inc.

The organic silicone resin suitable for the present disclosure may be any organic silicone resin known in the field to which this disclosure pertains, including but not limited to polyalkylsiloxane, polyarylsiloxane, polyalkarylsiloxane, modified polysiloxane or a combination thereof. Preferably, the organic silicone resin suitable for the present disclosure is an amino-modified organic silicone resin, such as but not limited to amino-modified organic silicone resins KF-8010, X-22-161A, X-22-161B, KF-8012, KF-8008, X-22-9409, and X-22-1660B-3 available from Shin-Etsu Chemical Co., Ltd., amino-modified organic silicone resins BY-16-853U, BY-16-853, and BY-16-853B available from Toray-Dow coming Co., Ltd., amino-modified organic silicone resins XF42-C5742, XF42-C6252 and XF42-C5379 available from Momentive Performance Materials JAPAN LLC, or a combination thereof.

According to one embodiment of the present disclosure, for example, the cyanate ester resin may include any one or more cyanate ester resins useful for preparing a prepreg, a resin film, a laminate or a printed circuit board, such as a compound having an Ar—O—C—N structure, wherein Ar may be a substituted or unsubstituted aromatic group. In terms of improving the thermal resistance of the resin composition, examples of the cyanate ester resin include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin, fluorene cyanate ester resin or a combination thereof. The novolac cyanate ester resin may be bisphenol A novolac cyanate ester resin, bisphenol F novolac cyanate ester resin or a combination thereof. For example, the cyanate ester resin may be available under the product name Primaset PT-15, PT-30S, PT-60S, BA-200, BA-230S, BA-3000S, BTP-2500, BTP-6020S, DT-4000, DT-7000, ULL950S, HTL-300, CE-320, LVT-50, or LeCy sold by Arxada AG.

According to one embodiment of the present disclosure, unless otherwise specified, the maleimide triazine resin used in the present disclosure is not particularly limited and may include any one or more maleimide triazine resins useful for preparing a prepreg, a resin film, a laminate or a printed circuit board. For example, the maleimide triazine resin may be obtained by polymerizing the aforesaid cyanate ester resin and the aforesaid maleimide resin. For example, the maleimide triazine resin may be obtained by polymerizing bisphenol A cyanate ester resin and maleimide resin, by polymerizing bisphenol F cyanate ester resin and maleimide resin, by polymerizing phenol novolac cyanate ester resin and maleimide resin or by polymerizing dicyclopentadiene-containing cyanate ester resin and maleimide resin, but not limited thereto. For example, the maleimide triazine resin may be obtained by polymerizing the cyanate ester resin and the maleimide resin at any molar ratio. For example, relative to 1 mole of the maleimide resin, 1 to 10 moles of the cyanate ester resin may be used. For example, relative to 1 mole of the maleimide resin, 1, 2, 4, or 6 moles of the cyanate ester resin may be used, but not limited thereto.

According to one embodiment of the present disclosure, the resin composition may further comprise an additive which comprises any one or more of the following: flame retardant, curing accelerator, inorganic filler, surface treating agent, coloring agent, amine curing agent, toughening agent, and solvent.

According to one embodiment of the present disclosure, a suitable flame retardant may be any one or more flame retardants used for preparing a prepreg, a resin film, a laminate or a printed circuit board, including but not limited to a phosphorus-containing flame retardant or a bromine-containing flame retardant. For example, the bromine-containing flame retardant preferably comprises decabromodiphenyl ethane. For example, the phosphorus-containing flame retardant may comprise, but not limited to, ammonium polyphosphate, hydroquinone bis-(diphenylphosphate), bisphenol A bis-(diphenylphosphate), tri(2-carboxyethyl) phosphine, tri(chloroisopropyl) phosphate, trimethyl phosphate, dimethyl methyl phosphonate, resorcinol bis(dixylenyl phosphate) such as commercially available PX-200, PX-201 and PX-202, phosphazene such as commercially available SPB-100, SPH-100 and SPV-100, melamine polyphosphate, melamine cyanurate, trihydroxy ethyl isocyanurate, aluminium phosphinate such as commercially available OP-930 and OP-935, diphenylphosphine oxide (DPPO) compound such as di-DPPO compound, 9,10-dihydro-9-oxa-10-phosphaphenanthrene-10-oxide (DOPO) such as di-DOPO compound, DOPO resin such as DOPO-HQ, DOPO-NQ, DOPO-PN and DOPO-BPN, DOPO-containing epoxy resin, or a combination thereof, wherein DOPO-PN is a DOPO phenol novolac compound, and DOPO-BPN may be a bisphenol novolac compound such as DOPO-BPAN, DOPO-BPFN or DOPO-BPSN.

According to one embodiment of the present disclosure, for example, the curing accelerator (including curing initiator) suitable for the present disclosure may comprise a catalyst, such as a Lewis base or a Lewis acid. The Lewis base includes imidazole, boron trifluoride amine complex, ethyltriphenyl phosphonium chloride, 2-methylimidazole, 2-phenylimidazole, 2-ethyl-4-methylimidazole, triphenylphosphine, 4-dimethylaminopyridine or any combination thereof. The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide, 2,5-dimethyl-2,5-di(tert-butylperoxy)-3-hexyne, bis(tert-butyl peroxyisopropyl)benzene or a combination thereof.

According to one embodiment of the present disclosure, for example, the inorganic filler suitable for the present disclosure may include, but not limited to, silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, zinc molybdate-modified talc, zinc oxide, zirconium oxide, mica, boehmite (AlOOH), calcined talc, talc, silicon nitride, calcined kaolin, or a combination thereof. Moreover, the inorganic filler can be spherical (including solid sphere or hollow sphere), fibrous, plate-like, particulate, flake-like or whisker-like and can be optionally pretreated by a silane coupling agent.

According to one embodiment of the present disclosure, for example, the surface treating agent suitable for the present disclosure comprises silane coupling agent, organosilicon oligomer, titanate coupling agent or a combination thereof. The addition of the surface treating agent may promote the dispersivity of the inorganic filler and the compatibility with resin components. For example, the silane coupling agent may comprise silane (such as but not limited to siloxane), which may be further categorized according to the functional groups into amino silane, epoxide silane, vinyl silane, ester silane, hydroxyl silane, isocyanate silane, methacryloxy silane and acryloxy silane. Preferably, vinyl silane, methacryloxy silane or acryloxy silane is used for surface treatment.

According to one embodiment of the present disclosure, for example, the coloring agent suitable for the present disclosure may comprise, but not limited to, dye or pigment.

According to one embodiment of the present disclosure, for example, the amine curing agent may be any amine curing agent known in the field to which this disclosure pertains. Examples include but are not limited to any one or a combination of diamino diphenyl sulfone, diamino diphenyl methane, diamino diphenyl ether, diamino diphenyl sulfide and dicyandiamide. For example, in the resin composition of the present disclosure, based on a total of 100 parts by weight of the polyphenylene ether resin of Formula (1), the amount of the amine curing agent is 1 to 15 parts by weight, such as within the scope defined by a combination of any two amounts below: 1 part by weight, 4 parts by weight, 5 parts by weight, 7.5 parts by weight, 10 parts by weight, 12 parts by weight or 15 parts by weight.

The purpose of toughening agent used herein is to improve the toughness of the resin composition. The toughening agent may comprise, but not limited to, carboxyl-terminated butadiene acrylonitrile rubber (CTBN rubber), core-shell rubber, etc.

The purpose of adding solvent to the resin composition according to the present disclosure is to dissolve the components in the resin composition so as to change the solid content of the resin composition and to adjust the viscosity of the resin composition. For example, the solvent may comprise, but not limited to, methanol, ethanol, ethylene glycol monomethyl ether, acetone, butanone (i.e., methyl ethyl ketone), methyl isobutyl ketone, cyclohexanone, N-methylpyrrolidone, toluene, xylene, methoxyethyl acetate, ethoxyethyl acetate, propoxyethyl acetate, ethyl acetate, propylene glycol methyl ether, dimethyl formamide, dimethyl acetamide, or a mixture thereof.

One embodiment of the present disclosure relates to the use of the resin composition of the present disclosure in making articles, such as the application in electronic products, such as the application of insulating materials in electronic products including but not limited to a prepreg, a resin film, a laminate or a printed circuit board.

Another embodiment of the present disclosure relates to an article made from the resin composition of the present disclosure, examples of the article including electronic products such as but not limited to a prepreg, a resin film, a laminate or a printed circuit board.

According to one embodiment of the present disclosure, for example, the resin composition according to each of the various embodiments disclosed herein may be used to make a prepreg, which has a reinforcement material and a layered structure formed thereon, wherein the layered structure is made by heating the resin composition at high temperature to a semi-cured state (B-stage). Suitable baking temperature for making the prepreg may be for example 120° C. to 180° C. For example, the reinforcement material may be any one of a fiber material, woven fabric, and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pretreated by a silane coupling agent. The prepreg may be further heated and cured to the C-stage to form an insulation layer. According to one embodiment of the present disclosure, by well mixing each resin composition to form a varnish, loading the varnish into an impregnation tank, impregnating a fiberglass fabric into the impregnation tank to adhere the resin composition onto the fiberglass fabric, and proceeding with heating and baking at a proper temperature to a semi-cured state, a prepreg may be obtained.

According to one embodiment of the present disclosure, for example, the resin composition from each embodiment of the present disclosure can be used to make a resin film, which is prepared by heating and baking the resin composition to the semi-cured state. For example, by selectively coating the resin composition from each embodiment of the present disclosure on a liquid crystal polymer film, a polytetrafluoroethylene film, a polyethylene terephthalate film or a polyimide film, followed by heating and baking at a proper temperature to a semi-cured state, a resin film may be obtained. For example, the resin composition from each embodiment may be coated on a copper foil to uniformly adhere the resin composition thereon, followed by heating and baking at a proper temperature to a semi-cured state to obtain the resin film.

According to one embodiment of the present disclosure, for example, the resin composition from each embodiment of the present disclosure may be made into a laminate, which comprises at least two metal foils and at least one insulation layer disposed between the metal foils, wherein the insulation layer is made by curing the resin composition at high temperature and high pressure to the C-stage, a suitable curing temperature being for example between 190° C. and 320° C. and preferably between 200° C. and 250° C. and a suitable curing time being 90 to 300 minutes and preferably 120 to 250 minutes. The insulation layer may be obtained by curing the aforesaid prepreg or resin film. The metal foil may contain copper, aluminum, nickel, platinum, silver, gold or alloy thereof, such as a copper foil. In a preferred embodiment, the laminate is a copper-clad laminate.

According to one embodiment of the present disclosure, for example, the resin compositions of various embodiments of the present disclosure may be used to make a printed circuit board. In one embodiment of making the printed circuit board according to the present disclosure, a double-sided copper-clad laminate (such as product EM-827, available from Elite Material Co., Ltd.) with a thickness of 28 mil and having 1-ounce (oz) HTE (high temperature elongation) copper foils may be used and subjected to drilling and then electroplating, so as to form electrical conduction between the top layer copper foil and the bottom layer copper foil. Then the top layer copper foil and the bottom layer copper foil are etched to form inner layer circuits. Then brown oxidation and roughening are performed on the inner layer circuits to form uneven structures on the surface to increase roughness. Next, a vacuum lamination apparatus is used to laminate the assembly of a copper foil, the prepreg, the inner layer circuit board, the prepreg and a copper foil stacked in said order by heating at 190° C. to 320° C. for 90 to 300 minutes to cure the insulation material of the prepregs. Next, black oxidation, drilling, copper plating and other known circuit board processes are performed on the outmost copper foils so as to obtain the printed circuit board.

Not bound by any specific theory, preferably, various resin compositions of the present disclosure or articles made therefrom may achieve improvement in one or more of the following properties: resin filling void, glass transition temperature, Z-axis ratio of thermal expansion, dielectric constant, dissipation factor, warpage, etc.

For example, the resin composition according to the present disclosure or the article made therefrom may achieve one, more (e.g., two, three, four, or five) or all of the following properties:
- absence of void on the surface of a copper-free inner layer wiring laminate as measured by a resin filling void test;
- a Z-axis ratio of thermal expansion as measured by reference to IPC-TM-650 2.4.24.5 of less than or equal to 1.27%, such as between 1.18% and 1.27%; a dielectric constant at 10 GHz as measured by reference to JIS C2565 of less than or equal to 3.3, such as between 2.8 and 3.3;
- a dissipation factor at 10 GHz as measured by reference to JIS C2565 of less than or equal to 0.0035, such as between 0.0026 and 0.0035;
- a glass transition temperature as measured by reference to IPC-TM-650 2.4.24.4 of greater than or equal to 246° C., such as between 246° C. and 252° C.; and a warpage as measured by a warpage test of less than or equal to 32 m, such as between 23 m and 32 m.

Examples and embodiments are described in detail below to facilitate better understanding of the present disclosure. It will be understood that these examples and embodiments are exemplary only and are not intended to be limiting. Reagents used in the examples are commercially available from the market unless otherwise specified.

Processes and conditions used in the examples are routine processes and conditions unless otherwise specified.

EXAMPLES

The names of reagents used in the Examples and Comparative Examples are listed in Table 3:

TABLE 3

| Name | Description | Source |
| --- | --- | --- |
| B1 | ![structure] | Changzhou Jiana Chemical Co., Ltd. |
| B2 | ![structure] | Changzhou Yipintang Chemical Co., Ltd. |
| C1 | ![structure] | Changzhou Yipintang Chemical Co., Ltd. |

TABLE 3-continued

| Name | Description | Source |
|---|---|---|
| C2 | (structure: 1,1,3,3-tetramethylisoindolin-2-yloxyl) | Changzhou Yipintang Chemical Co., Ltd. |
| D1 | (structure: tris(2,2,6,6-tetramethyl-1-oxyl-piperidin-4-yl) phosphite) | Wuxi FuAn Chemical Plant |
| SA9000 | bis-methacryloyl-terminated polyphenylene ether resin, number average molecular weight (Mn) of about 1900 to 2300, a non-inventive polyphenylene ether resin | SABIC |
| OPE-2st 1200 | bis-vinylbenzyl-terminated polyphenylene ether resin, number average molecular weight (Mn) of about 1200, a non-inventive polyphenylene ether resin | Mitsubishi Gas Chemical Co., Inc. |
| SA90 | bis-hydroxyl-terminated polyphenylene ether resin, number average molecular weight (Mn) of about 1700 to 1900, a non-inventive polyphenylene ether resin | SABIC |
| BMI-70 | 3,3-dimethyl-5,5-diethyl-4,4-diphenylmethane bismaleimide resin | K.I Chemical Industry Co., Ltd. |
| PT-30S | cyanate ester resin | Arxada AG |
| B-3000 | polybutadiene | Nippon Soda Co., Ltd. |
| TAIC | triallyl isocyanurate | commercially available |
| SC-2500 SVJ | spherical silica pre-treated by silane coupling agent | Admatechs Company Limited |
| DCP | dicumyl peroxide | Kingyorker Enterprise Co., Ltd. |
| toluene | solvent, analytically pure | commercially available |

Polyphenylene ether resins having different amounts of Z groups and different Y groups were synthesized according to PREPARATION EXAMPLEs 1-5 for the purpose of formulating Examples and Comparative Examples.

Preparation Example 1

A polyphenylene ether resin with m+n=6 (i.e., containing 7 Z groups and 8 Y groups) and all Y groups being hydrogen (i.e., hydroxyl-terminated hyperbranched polyphenylene ether) was prepared in PREPARATION EXAMPLE 1, which is not within the scope of the present disclosure and denoted as "comparative polyphenylene ether resin 1".

The comparative polyphenylene ether resin 1 was prepared as follow: 6.01 g of p-bromobenzaldehyde and 6.33 g of phenol were dissolved in 12 mL of glacial acetic acid; after being dissolved, the materials were cooled to 0° C. and then stirred continuously, during which a mixture of 12 mL of concentrated sulfuric acid and 40 mL of glacial acetic acid was added slowly. After the addition was completed, under continuous stirring, the reaction was carried out at 0° C. for 72 hours. After the reaction was completed, the materials were poured into iced water and stirred therein for 1 hour, the solid product was filtered and washed with water until the filtrate became neutral, and then the product was vacuum-dried to obtain a tangerine solid, which was then subjected to three times of recrystallization with benzene.

Under a nitrogen atmosphere, 10 g of the product above, excess $K_2CO_3$ and toluene were added in one batch to DMSO (dimethyl sulfoxide), and the mixture was heated and subjected to dehydration and reflow for 4 hours; after heating, the reaction system was cooled to 40° C. A small amount of CuCl and excess phenol were added, and the reaction was continued at 170° C. for 8 hours to remove bromine. After the reaction was completed, the mixture was cooled to room temperature and added with 0.1 mol/L of hydrochloric acid and stirred to carry out acidification; after 1 hour of stirring, the reacted materials were dropped into a methanol-water mixture (volume ratio of methanol to water is 4:6) to precipitate the solid product, which was filtered and recovered and then dried at 60° C. The crude product was dissolved in a small amount of tetrahydrofuran to filter and remove insoluble matters. The filtrate was dropped into cyclohexane and filtered to collect the precipitate, which was then washed with cyclohexane for several times and vacuum-dried at 90° C. to obtain the final product.

Analyzed by gel permeation chromatography (GPC), the comparative polyphenylene ether resin 1 has a number average molecular weight (Mn) of about 2500, having 7 Z groups (i.e., m+n=6), all Y groups being hydrogen and $Q_1$-$Q_{12}$ on the benzene ring all being hydrogen.

Preparation Example 2

A polyphenylene ether resin with m+n=30 (i.e., containing 31 Z groups and 32 Y groups) and all Y groups being vinylbenzyl groups was prepared in PREPARATION EXAMPLE 2, which is within the scope of the present disclosure and denoted as "polyphenylene ether resin 1".

The polyphenylene ether resin 1 was prepared as follow: 42.07 g of p-bromobenzaldehyde and 57.59 g of 2,6-dimethylphenol were dissolved in 84 mL of glacial acetic acid; after being dissolved, the materials were cooled to 0° C. and then stirred continuously, during which a mixture of 84 mL of concentrated sulfuric acid and 280 mL of glacial acetic acid was added slowly. After the addition was completed, under continuous stirring, the reaction was carried out at 0° C. for 72 hours. After the reaction was completed, the materials were poured into iced water and stirred therein for 1 hour, the solid product was filtered and washed with water until the filtrate became neutral, and then the product was vacuum-dried to obtain a tangerine solid, which was then subjected to three times of recrystallization with benzene.

Under a nitrogen atmosphere, 50 g of the tangerine solid above, excess $K_2CO_3$ and toluene were added in one batch to DMSO (dimethyl sulfoxide), and the mixture was heated and subjected to dehydration and reflow for 4 hours; after heating, the reaction system was cooled to 40° C. A small amount of CuCl was added, and the reaction temperature was increased to 170° C. to react for 32 hours. Then the mixture was cooled to room temperature and added with 0.1 mol/L of hydrochloric acid and stirred to carry out acidification; after 1 hour of stirring, the reacted materials were dropped into a methanol-water mixture (volume ratio of methanol to water is 4:6) to precipitate the solid product, which was filtered and recovered and then dried at 60° C.

Under a nitrogen atmosphere, the product above, excess $K_2CO_3$ and toluene were added in one batch to DMSO (dimethyl sulfoxide), and the mixture was heated and subjected to dehydration and reflow for 4 hours; after heating, the reaction system was cooled to 40° C. A small amount of CuCl and excess phenol were added, and the reaction was continued at 170° C. for 8 hours to remove bromine. After the reaction was completed, the mixture was cooled to room temperature and added with 0.1 mol/L of hydrochloric acid and stirred to carry out acidification; after 1 hour of stirring, the reacted materials were dropped into a methanol-water mixture (volume ratio of methanol to water is 4:6) to precipitate the solid product, which was filtered and recovered and then dried at 60° C. The crude product was dissolved in a small amount of tetrahydrofuran to filter and remove insoluble matters. The filtrate was dropped into cyclohexane and filtered to collect the precipitate, which was then washed with cyclohexane for several times and vacuum-dried at 90° C. to obtain the final product.

25 g of sodium hydride (NaH) was placed in a dried four-necked flask (1000 mL), to which 100 mL of refined tetrahydrofuran was added, and then 153 g of 4-chloromethyl styrene dissolved in 100 mL of tetrahydrofuran was added dropwise to the solution in a one-hour duration. The mixture was stirred for 6 hours under nitrogen protection. 400 g of the product above was dissolved in 400 mL of tetrahydrofuran and then added dropwise to the reaction system in a three-hour duration, reflowed and stirred for 48 hours, and added with 0.1 mol/L of hydrochloric acid and stirred to carry out acidification; after 1 hour of stirring, the product was subjected to multiple times of rotary evaporation, washing, precipitation, and drying, followed by product collection.

Figure 3:
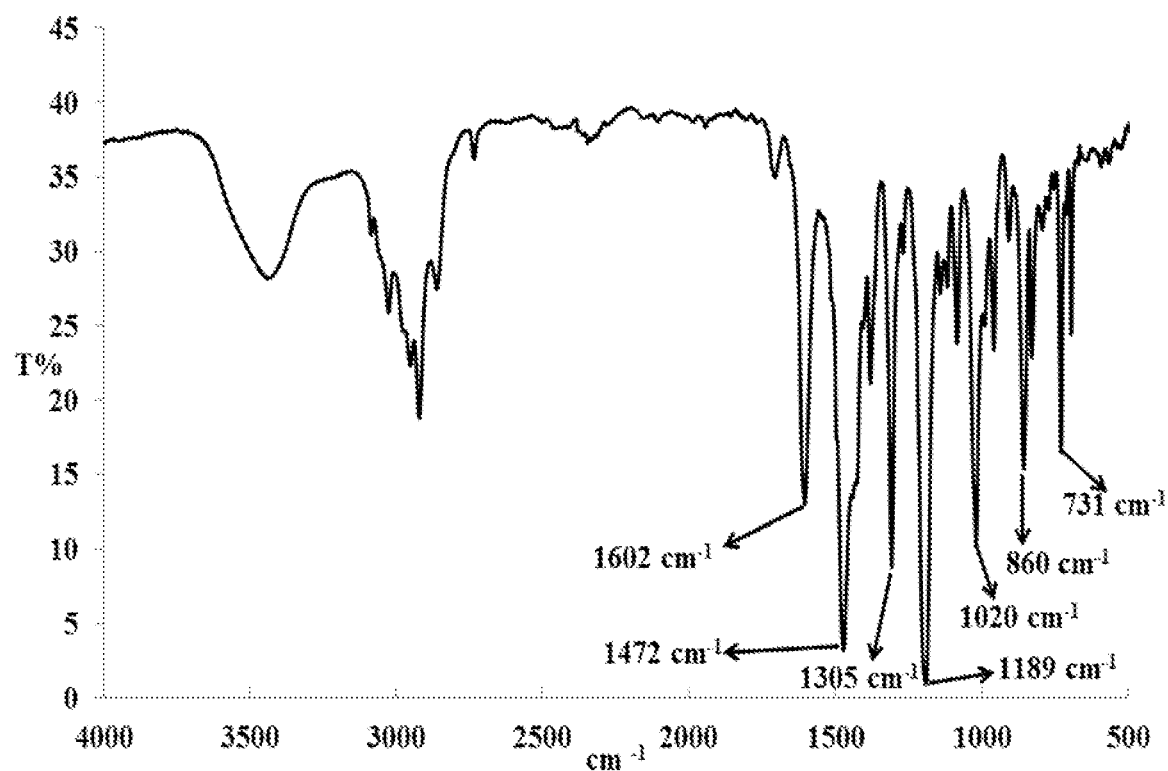
FIG. 3 illustrates the FTIR spectrum of the polyphenylene ether resin 1.
Figure 4:
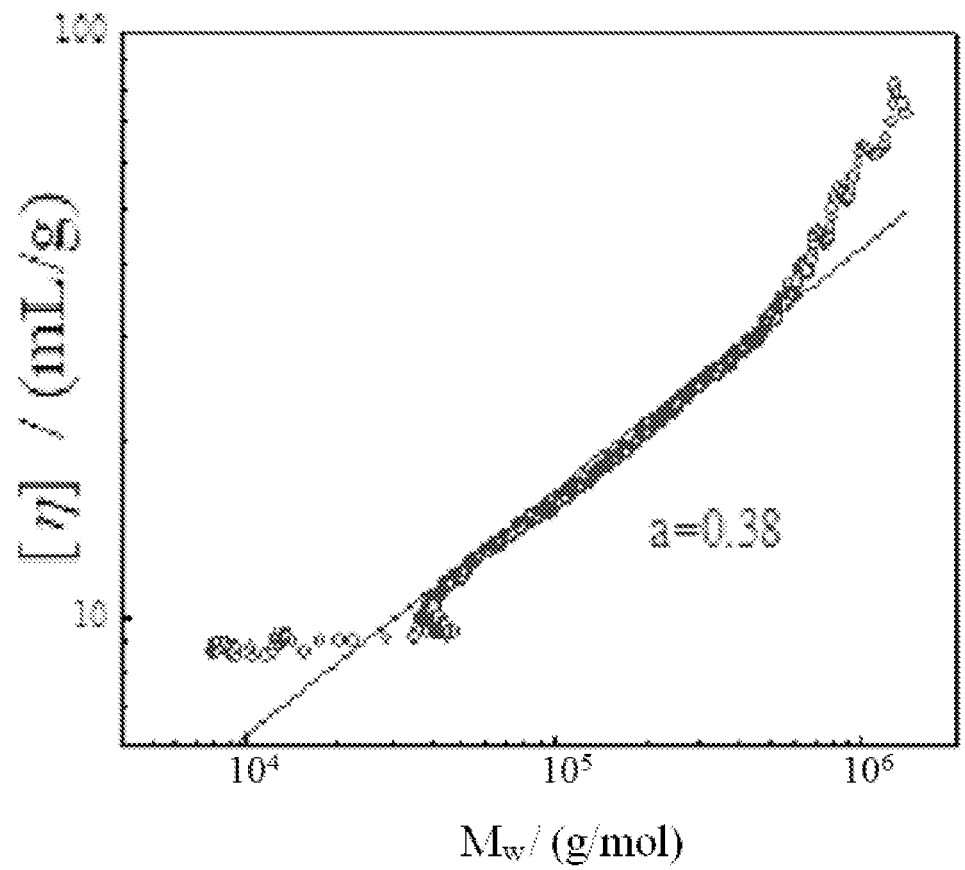
FIG. 4 illustrates the Mark-Houwink plot of the polyphenylene ether resin 1.

Analyzed by gel permeation chromatography (GPC), the polyphenylene ether resin 1 has an Mn of about 12000. FIG. 3 illustrates the FTIR spectrum of the polyphenylene ether resin 1, wherein the peaks at 860 cm$^{-1}$ and 731 cm$^{-1}$ represent the double bond absorption peaks of the vinylbenzyl group, the peaks at 1305 cm$^{-1}$, 1189 cm$^{-1}$ and 1020 cm$^{-1}$ represent the C—O absorption peaks of the phenylene ether, and the peaks at 1602 cm$^{-1}$ and 1472 cm$^{-1}$ represent the C=C double bond absorption peaks of the benzene ring, thereby proving that the hyperbranched polyphenylene ether is a vinylbenzyl-containing polyphenylene ether. FIG. 4 illustrates the Mark-Houwink plot of the polyphenylene ether resin 1. According to the parameter a in the Mark-Houwink plot ([η]~Mw, wherein [η] represents intrinsic viscosity and Mw represents weight average molecular weight), the shape of a polymer in a certain solvent can be deduced. In a benign solution, a hyperbranched polymer has an α value of 0.3-0.5. Based on the Mark-Houwink plot in FIG. 4, the α value of the polyphenylene ether resin 1 is calculated to be 0.38, indicating the presence of a hyperbranched structure. It contains 31 Z groups and 32 Y groups (i.e., m+n=30), all Y groups are a vinylbenzyl group, and in $Q_1$-$Q_{12}$ on the benzene ring, $Q_5$, $Q_5$, $Q_{10}$ and $Q_{11}$ are a methyl group, and $Q_1$, $Q_2$, $Q_3$, $Q_4$, $Q_6$, $Q_7$, $Q_9$ and $Q_{12}$ are hydrogen.

Preparation Example 3

A polyphenylene ether resin with m+n=35 (i.e., containing 36 Z groups and 37 Y groups) and all Y groups being methacryloyl groups was prepared in PREPARATION EXAMPLE 3, which is within the scope of the present disclosure and denoted as "polyphenylene ether resin 2".

The polyphenylene ether resin 2 was prepared as follow: 54.09 g of p-bromobenzaldehyde and 56.96 g of phenol were dissolved in 108 mL of glacial acetic acid; after being dissolved, the materials were cooled to 0° C. and then stirred continuously, during which a mixture of 108 mL of concentrated sulfuric acid and 360 mL of glacial acetic acid was added slowly. After the addition was completed, under continuous stirring, the reaction was carried out at 0° C. for 72 hours. After the reaction was completed, the materials were poured into iced water and stirred therein for 1 hour, the solid product was filtered and washed with water until the filtrate became neutral, and then the product was vacuum-dried to obtain a tangerine solid, which was then subjected to three times of recrystallization with benzene.

Under a nitrogen atmosphere, 70 g of the tangerine solid above, excess $K_2CO_3$ and toluene were added in one batch to DMSO (dimethyl sulfoxide), and the mixture was heated and subjected to dehydration and reflow for 4 hours; after heating, the reaction system was cooled to 40° C. A small amount of CuCl was added, and the reaction temperature was increased to 170° C. to react for 38 hours. Then the mixture was cooled to room temperature and added with 0.1 mol/L of hydrochloric acid and stirred to carry out acidification; after 1 hour of stirring, the reacted materials were dropped into a methanol-water mixture (volume ratio of methanol to water is 4:6) to precipitate the solid product, which was filtered and recovered and then dried at 60° C.

Under a nitrogen atmosphere, the product above, excess $K_2CO_3$ and toluene were added in one batch to DMSO (dimethyl sulfoxide), and the mixture was heated and subjected to dehydration and reflow for 4 hours; after heating, the reaction system was cooled to 40° C. A small amount of CuCl and excess phenol were added, and the reaction was continued at 170° C. for 8 hours to remove bromine. After the reaction was completed, the mixture was cooled to room temperature and added with 0.1 mol/L of hydrochloric acid and stirred to carry out acidification; after 1 hour of stirring, the reacted materials were dropped into a methanol-water mixture (volume ratio of methanol to water is 4:6) to precipitate the solid product, which was filtered and recovered and then dried at 60° C. The crude product was dissolved in a small amount of tetrahydrofuran to filter and remove insoluble matters. The filtrate was dropped into cyclohexane and filtered to collect the precipitate, which was then washed with cyclohexane for several times and vacuum-dried at 90° C. to obtain the final product.

25 g of sodium hydride (NaH) was placed in a dried four-necked flask (1000 mL), to which 100 mL of refined tetrahydrofuran was added, and then 104 g of methacryloyl chloride dissolved in 100 mL of tetrahydrofuran was added dropwise to the solution in a one-hour duration. The mixture was reflowed and stirred for 6 hours under nitrogen protection. 400 g of the product above was dissolved in 400 mL of tetrahydrofuran and then added dropwise to the reaction system in a three-hour duration, steadily heated to 67° C. in 0.5 hour, reflowed and stirred for 48 hours, and added with 0.1 mol/L of hydrochloric acid and stirred to carry out acidification; after 1 hour of stirring, the product was subjected to multiple times of rotary evaporation, washing, precipitation, and drying, followed by product collection.

Analyzed by gel permeation chromatography (GPC), the polyphenylene ether resin 2 has an Mn of about 8100. Based on the Mark-Houwink plot, the $\alpha$ value of the polyphenylene ether resin 2 is calculated to be 0.31, indicating the presence of a hyperbranched structure. It has 36 Z groups and 37 Y groups (i.e., m+n=35), all Y groups being a methacryloyl group and $Q_1$-$Q_{12}$ on the benzene ring all being hydrogen.

Preparation Example 4

A polyphenylene ether resin with m+n=10 (i.e., containing 11 Z groups and 12 Y groups) and all Y groups being trifluoromethylphenylacryloyl groups was prepared in PREPARATION EXAMPLE 4, which is within the scope of the present disclosure and denoted as "polyphenylene ether resin 3".

The polyphenylene ether resin 3 was prepared as follow: 24.04 g of p-bromobenzaldehyde and 25.32 g of phenol were dissolved in 48 mL of glacial acetic acid; after being dissolved, the materials were cooled to 0° C. and then stirred continuously, during which a mixture of 48 mL of concentrated sulfuric acid and 160 mL of glacial acetic acid was added slowly. After the addition was completed, under continuous stirring, the reaction was carried out at 0° C. for 72 hours. After the reaction was completed, the materials were poured into iced water and stirred therein for 1 hour, the solid product was filtered and washed with water until the filtrate became neutral, and then the product was vacuum-dried to obtain a tangerine solid, which was then subjected to three times of recrystallization with benzene.

Under a nitrogen atmosphere, the tangerine solid above, excess $K_2CO_3$ and toluene were added in one batch to DMSO (dimethyl sulfoxide), and the mixture was heated and subjected to dehydration and reflow for 4 hours; after heating, the reaction system was cooled to 40° C. A small amount of CuCl was added, and the reaction temperature was increased to 170° C. to react for 13 hours. Then the mixture was cooled to room temperature and added with 0.1 mol/L of hydrochloric acid and stirred to carry out acidification; after 1 hour of stirring, the reacted materials were dropped into a methanol-water mixture (volume ratio of methanol to water is 4:6) to precipitate the solid product, which was filtered and recovered and then dried at 60° C.

Under a nitrogen atmosphere, 20 g of the product above, excess $K_2CO_3$ and toluene were added in one batch to DMSO (dimethyl sulfoxide), and the mixture was heated and subjected to dehydration and reflow for 4 hours; after heating, the reaction system was cooled to 40° C. A small amount of CuCl and excess phenol were added, and the reaction was continued at 170° C. for 8 hours to remove bromine. After the reaction was completed, the mixture was cooled to room temperature and added with 0.1 mol/L of hydrochloric acid and stirred to carry out acidification; after 1 hour of stirring, the reacted materials were dropped into a methanol-water mixture (volume ratio of methanol to water is 4:6) to precipitate the solid product, which was filtered and recovered and then dried at 60° C. The crude product was dissolved in a small amount of tetrahydrofuran to filter and remove insoluble matters. The filtrate was dropped into cyclohexane and filtered to collect the precipitate, which was then washed with cyclohexane for several times and vacuum-dried at 90° C. to obtain the final product.

25 g of sodium hydride (NaH) was placed in a dried four-necked flask (1000 mL), to which 100 mL of refined tetrahydrofuran was added for dissolving the sodium hydride, and then 234 g of trifluoromethylcinnamoyl chloride dissolved in 100 mL of tetrahydrofuran was added dropwise to the solution in a one-hour duration. The mixture was reflowed and stirred for 6 hours under nitrogen protection. 400 g of the product above was dissolved in 400 mL of tetrahydrofuran and then added dropwise to the reaction system in a three-hour duration, steadily heated to 67° C. in 0.5 hour, reflowed and stirred for 48 hours, and added with 0.1 mol/L of hydrochloric acid and stirred to carry out acidification; after 1 hour of stirring, the product was subjected to multiple times of rotary evaporation, washing, precipitation, and drying, followed by product collection.

Analyzed by gel permeation chromatography (GPC), the polyphenylene ether resin 3 has an Mn of about 5000. Based on the Mark-Houwink plot, the $\alpha$ value of the polyphenylene ether resin 3 is calculated to be 0.42, indicating the presence of a hyperbranched structure. It has 11 Z groups and 12 Y groups (i.e., m+n=10), all Y groups being a trifluoromethylphenylacryloyl group and $Q_1$-$Q_{12}$ on the benzene ring all being hydrogen.

Preparation Example 5

A polyphenylene ether resin of Formula (22) was synthesized in the PREPARATION EXAMPLE 5, which contains 6 Z groups (i.e., m+n=5), and the Y groups include a combination of propenyl, hydrogen and 2,3-epoxy-1-propyl, and which is not within the scope of the present disclosure and denoted as "comparative polyphenylene ether resin 2".

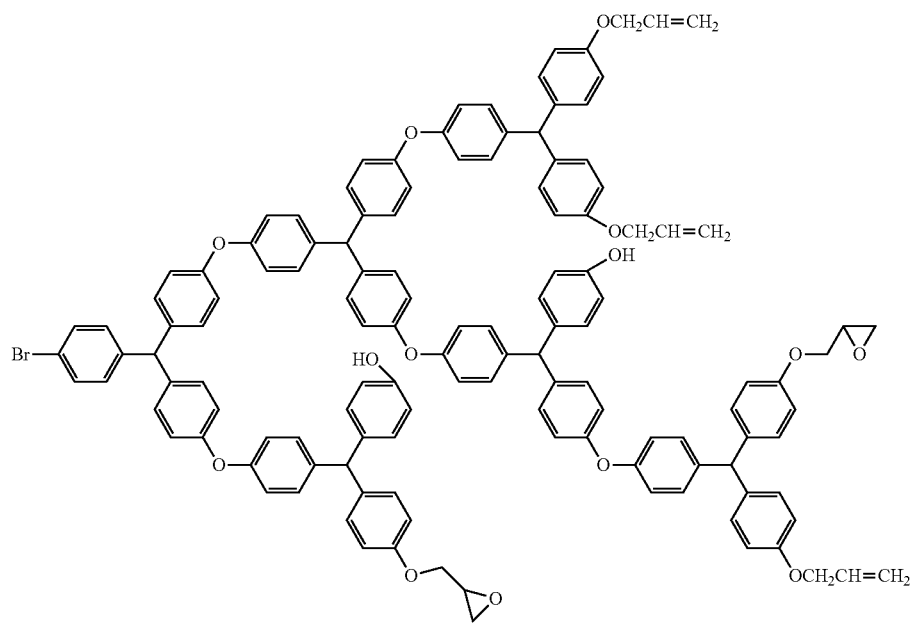

Formula (22)

Under a nitrogen atmosphere, 2.41 g (6.82 mmol) of 4-bromo-4',4''-dihydroxytriphenylmethane, 1.08 g (7.81 mmol) of anhydrous $K_2CO_3$ and 25.0 mL of toluene were sequentially added to 98 mL of dimethyl sulfoxide (DMSO), and the mixture was heated to reflow and dehydration for 3 hours. After that, the reaction system was cooled to 45° C., added with 13.5 mg (0.14 mmol) of a catalyst CuCl and then heated to 170° C. again and reacted at the constant temperature for 40 hours. After the reaction was completed, the mixture was cooled to room temperature, acidified with hydrochloric acid, stirred for 0.5 hour and then dropped into a methanol-water mixture (volume ratio of methanol to water is 4:6) to precipitate the solid product, which was filtered and vacuum-dried at 60° C. to obtain the crude product. The crude product was dissolved in a small amount of tetrahydrofuran (THF) to filter and remove insoluble matters. The filtrate was added with a small amount of cyclohexane to precipitate the solid part, and the solid precipitate was filtered and collected, washed with cyclohexane and vacuum-dried at 90° C. to obtain the intermediate 1.

Under a nitrogen atmosphere and at ambient temperature, 100 g of the aforesaid intermediate 1, 5 g of sodium hydroxide and 50 g of tetrahydrofuran (THF) were added to a three-necked flask. The mixture was heated to 50° C. for stirring for 0.1 hour. The reaction system was cooled to 40° C. and added dropwise with 10 g of 3-chloropropene within a duration of 0.1 hour. The mixture was reflowed under thermal insulation for 10 hours and then heated to 60° C. and further reflowed for 2 hours at 60° C.

After the reaction was completed, the reaction system was cooled to room temperature, and, under stirring, the reacted materials were added dropwise into an ethanol-water mixture (volume ratio of ethanol to water is 2:1) to form a solid precipitate, which was filtered and recovered. The filter cake was vacuum-dried at 40° C. and then dissolved in tetrahydrofuran (THF) to form a solution; under stirring, the solution was added dropwise into cyclohexane to form a solid precipitate, which was filtered and recovered, and the filter cake was vacuum-dried at 40° C. to obtain the intermediate 2.

Under a nitrogen atmosphere, 100 g of the aforesaid intermediate 2 was dissolved in 100 g of THF, and the solution was added with 10 g of perbenzoic acid and reacted for 10 hours at 30° C. After the reaction was completed, the solution was added dropwise into an methanol-water solution (volume ratio of methanol to water is 1:8) to form a solid precipitate, which was filtered and collected; the filter cake was washed with a methanol solution and then dried. Then the solid product was dissolved in THF and added dropwise to a small amount of cyclohexane to form a precipitate, which was filtered and recovered and vacuum-dried at 50° C. to obtain a solid product, which is a polyphenylene ether of Formula (22), i.e., the comparative polyphenylene ether resin 2.

Examples 1-10 and Comparative Examples 1-9

In Examples 1-10 and Comparative Examples 1-9 below, the polyphenylene ether resins 1-3 and comparative polyphenylene ether resins 1-2 obtained from PREPARATION EXAMPLEs 1-5 were respectively used to formulate a resin composition according to Table 4 and Table 5 below; these resin compositions were used to prepare a prepreg, a copper-containing laminate and a copper-free laminate, and the properties of the resin compositions thus obtained and articles made therefrom were characterized.

Specifically, the resin compositions of Examples 1-10 and Comparative 10 Examples 1-9 were prepared by mixing the components according to Table 4 and Table 5 in a stirred tank, wherein the amount of toluene as the solvent was adjusted as needed, such that the resin compositions thus obtained had a solid content of 65 wt %.

TABLE 4

Resin compositions of Examples 1-10 (E1-10)

| Component | | E1 | E2 | E3 | E4 | E5 | E6 | E7 | E8 | E9 | E10 |
|---|---|---|---|---|---|---|---|---|---|---|---|
| polyphenylene ether resin of Formula (1) | polyphenylene ether resin 1 | 100 | 100 | 100 | 100 | 100 | 100 | | | 70 | 60 |
| | polyphenylene ether resin 2 | | | | | | | 100 | | 20 | 10 |
| | polyphenylene ether resin 3 | | | | | | | | 100 | 10 | 30 |
| compound of Formula (2) | B1 | 0.008 | 0.3 | 2 | 0.05 | 1 | 0.3 | 0.3 | 0.3 | | 0.01 |
| | B2 | | | | | | | | | 0.03 | 0.01 |
| compound of Formula (3) | C1 | | | | | | | | | 0.05 | 0.01 |
| | C2 | | | | | | | | | 0.25 | 0.3 |
| compound of Formula (4) | D1 | | | | | | | | | 0.16 | 0.5 |
| polyolefin | B-3000 | | | | 40 | 40 | 40 | 40 | 40 | 15 | 50 |
| vinyl-containing crosslinking agent | TAIC | | | | 25 | 25 | 25 | 25 | 25 | 40 | 20 |
| inorganic filler | SC-2500 SVJ | 75 | 75 | 75 | 75 | 75 | 75 | 75 | 75 | 50 | 90 |
| curing accelerator | DCP | 0.5 | 0.5 | 0.5 | 0.5 | 0.5 | 0.5 | 0.5 | 0.5 | 0.3 | 0.8 |
| solvent | toluene (S/C = 65%) | PA | PA | PA | PA | PA | PA | PA | PA | PA | PA |
| | α | 0.38 | 0.38 | 0.38 | 0.38 | 0.38 | 0.38 | 0.31 | 0.42 | 0.38/0.31/0.42 | 0.38/0.31/0.42 |

TABLE 5

Resin compositions of Comparative Examples 1-9 (C1-9)

| Component | | C1 | C2 | C3 | C4 | C5 | C6 | C7 | C8 | C9 |
|---|---|---|---|---|---|---|---|---|---|---|
| polyphenylene ether resin of Formula (1) | polyphenylene ether resin 1 | | | | | 50 | 50 | 100 | | |
| other hyperbranched polyphenylene ether resin | comparative polyphenylene ether resin 1 | | | | | | | | 100 | |
| | comparative polyphenylene ether resin 2 | | | | | | | | | 100 |
| vinylbenzyl-containing polyphenylene ether resin | OPE2st-1200 | | 100 | | | | | | | |
| methacryloyl-containing polyphenylene ether resin | SA9000 | | | 100 | | | | | | |
| hydroxyl-containing polyphenylene ether resin | SA90 | | | | 100 | | | | | |
| bismaleimide | BMI-70 | | | | | 50 | | | | |
| cyanate ester resin | PT-30S | | | | | | 50 | | | |
| compound of Formula (2) | B1 | 0.3 | 0.3 | 0.3 | 0.3 | | | | 0.3 | 0.3 |
| polyolefin | B-3000 | 40 | 40 | 40 | 40 | 40 | 40 | 40 | 40 | 40 |
| vinyl-containing crosslinking agent | TAIC | 25 | 25 | 25 | 25 | 25 | 25 | 25 | 25 | 25 |
| inorganic filler | SC-2500 SVJ | 75 | 75 | 75 | 75 | 75 | 75 | 75 | 75 | 75 |
| curing accelerator | DCP | 0.5 | 0.5 | 0.5 | 0.5 | 0.5 | 0.5 | 0.5 | 0.5 | 0.5 |
| solvent | toluene (S/C = 65%) | PA | PA | PA | PA | PA | PA | PA | PA | PA |
| | α | / | / | / | / | / | / | 0.38 | 0.47 | 0.45 |

Specifically, resin compositions from the Examples and Comparative Examples were used to make various articles according to the steps below:

A. Prepreg: Resin composition from each Example or each Comparative Example in Table 4 and Table 5 was separately well-mixed in a stirred tank to form a varnish, wherein the "proper amount," abbreviated as "PA," of toluene as the solvent represents an amount of the solvent mixture capable of resulting in a solid content of 65 wt % (S/C=65% o) of the resin composition in the varnish. Then the varnish was loaded to an impregnation tank, and a fiberglass fabric (e.g., 2116, 1080 or 1027 L-glass fiber fabric, available from Asahi) was impregnated into the impregnation tank to adhere the resin composition onto the fiberglass fabric, followed by heating and baking at 140° C. for about 4 minutes to obtain a prepreg.

B. Copper-containing laminate (a.k.a. copper-clad laminate, 8-ply, formed by lamination of eight prepregs): Two 18 m HVLP (hyper very low profile) copper foils and eight prepregs obtained from 2116 L-glass fiber fabrics as above and having a resin content of about 55 wt % were prepared and stacked in the order of one copper foil, eight prepregs and one copper foil, followed by lamination under vacuum at 35 kgf/cm² and 210° C. for 120 minutes to form a copper-containing laminate. Insulation layers were formed by laminating to cure eight sheets of prepregs between the two copper foils, and the resin content of the insulation layers was about 55 wt %.

C. Copper-containing laminate (a.k.a. copper-clad laminate, 2-ply, formed by lamination of two prepregs): Two 18 m HVLP (hyper very low profile) copper foils and two prepregs obtained from 1080 L-glass fiber fabrics in Item A above and having a resin content of about 70 wt % were prepared and stacked in the order of one copper foil, two prepregs and one copper foil, followed by lamination under vacuum at 35 kgf/cm² and 210° C. for 120 minutes to form a copper-containing laminate. Insulation layers were formed by laminating to cure two sheets of prepregs between the two copper foils, and the resin content of the insulation layers was about 70 wt %.

D. Copper-free laminate (8-ply, formed by lamination of eight prepregs): Each aforesaid copper-containing laminate (8-ply) in Item B above was etched to remove the two copper foils to obtain a copper-free laminate (8-ply) formed by laminating eight sheets of prepregs and having a resin content of about 55 wt %.

E. Copper-free laminate (2-ply, formed by lamination of two prepregs): Each aforesaid copper-containing laminate (2-ply) in Item C above was etched to remove the two copper foils to obtain a copper-free laminate (2-ply) formed by laminating two sheets of prepregs and having a resin content of about 70 wt %.

The resin compositions and prepregs, copper-containing laminates and copper-free laminates made therefrom were subjected to the tests as described below to characterize the properties thereof.

Resin Filling Void Test:

A 2.5 mil copper-containing laminate was subjected to a conventional brown oxidation process to make a brown oxide treated wiring laminate as the inner layer used to evaluate the capability of resin flowing to and filling the open area between traces during prepreg lamination. The varnish of the resin composition from each Example or each Comparative Example was used to impregnate a 1027 L-glass fiber fabric and then baked at 140° C. for 4 minutes to obtain a prepreg with a resin content of about 71 wt % to 73 wt %. The 2.5 mil brown oxide treated wiring laminate was covered on both sides with the aforesaid prepregs, and then the outermost layers were respectively covered with a 18 m HVLP (hyper very low profile) copper foil. Lamination was performed for 2 hours by using a vacuum laminator at 35 kgf/cm² and 200° C. to form an inner layer wiring laminate with surface copper, and then the outermost copper foils were removed by etching to obtain an inner layer wiring laminate without surface copper (i.e., copper-free inner layer wiring laminate). The copper-free surface of the inner layer wiring laminate without surface copper was examined with naked eyes to determine whether voids of 1 mm or greater exist (i.e., resin insufficiency); the presence of voids is unacceptable because voids in a laminate after lamination will cause failure and scrap of a circuit board later on.

Glass Transition Temperature (Tg)

A copper-free laminate sample (obtained by laminating eight prepregs) in Item D above was subjected to the glass transition temperature measurement. The glass transition temperature (in ° C.) of each sample was measured by using a dynamic mechanical analysis (DMA) method by reference to IPC-TM-650 2.4.24.4 at a temperature range of 35° C. to 270° C. with a temperature increase rate of 2° C./minute. Higher glass transition temperature represents a better property of the sample.

Ratio of Thermal Expansion (Z-Axis, Z-PTE)

The copper-free laminate sample (obtained by laminating eight prepregs) in Item D above was tested by thermal mechanical analysis (TMA) during the measurement of the ratio of thermal expansion. Each sample was heated from 35° C. to 270° C. at a heating rate of 10° C./minute and then subjected to the measurement of ratio of thermal expansion in Z-axis (Z-PTE, in %) from 50° C. to 260° C. by reference to the method described in IPC-TM-650 2.4.24.5. Lower ratio of thermal expansion represents a better property of the sample, and a difference in ratio of thermal expansion in Z-axis of greater than or equal to 0.1% represents a substantial difference.

Dielectric Constant (Dk) and Dissipation Factor (Df)

The copper-free laminate (obtained by laminating two prepregs) in Item E above was subjected to dielectric constant and dissipation factor measurement. Each sample was measured by using a microwave dielectrometer (available from AET Corp.) by reference to JIS C2565 at room temperature (about 25° C.) and under 10 GHz frequency. Lower dielectric constant and lower dissipation factor represent better dielectric properties of the sample.

Warpage

Multiple 18 m hyper very low profile (HVLP) copper foils, a piece of prepreg of 1080 (resin solid content of about 70 wt %) L-glass fiber fabric and a piece of prepreg of 1027 (resin solid content of about 74 wt %) L-glass fiber fabric were prepared. First, the 1080 prepreg was laminated to form a copper-containing laminate (2-ply); the surface copper foils were etched to form predetermined wiring, the top and bottom sides were covered with the 1027 prepregs and copper foils and laminated again to form a 4-ply laminate, and then the surface copper foils were etched to form predetermined wiring. The processes above were repeated to form a 16-ply wiring laminate. In the warpage test, the 16-ply wiring laminate above was used as a sample and tested by using the Axp apparatus available from AKROMETRIX, in which the thermal deformation (following the temperature increase procedure specified in IPC-TM-650 2.6.27) of the wiring laminate when carrying components was simulated and measured, focusing on the warpage at the high density wiring area of the wiring laminate at 260° C. Lower warpage represents a better property of the sample.

α value of the polyphenylene ether measured by a triple-detector size exclusion chromatography (TD-SEC) system The triple-detector size exclusion chromatography (TD-SEC) system was purchased from Waters and equipped with a 2414 refractive index detector (DRI), a Wyatt TRI STAR mini DAWN multi-angle laser detector (MALLS) and a viscosity detector (DP). The triple-detector size exclusion chromatography (TD-SEC) system was used to measure the average molecular weight, molecular weight distribution, and intrinsic viscosity of various polyphenylene ethers from the PREPARATION EXAMPLEs, using a testing temperature of 35° C., the mobile phase being THF, the flow rate being 1 mL/min, using a linear PMMA as the reference, the chromatography columns being a tandem of four columns including Styagel HR1THF 7.8'300 mm, Styagel HR3THF 7.8'300 mm, Styagel HR4THF 7.8'300 mm and Styagel HR5THF 7.8'300 mm, and the α value was directly measured after completing the parameter setting above.

Results of Examples 1-10 (E1-E10) and Comparative Examples 1-9 (C1-C9) are respectively listed in Table 6 and Table 7 below.

TABLE 6

Results of resin compositions of Examples 1-10 (E1-E10)

| Condition | Unit | E1 | E2 | E3 | E4 | E5 | E6 | E7 | E8 | E9 | E10 |
|---|---|---|---|---|---|---|---|---|---|---|---|
| Resin filling void | / | OK | OK | OK | OK | OK | OK | OK | OK | OK | OK |
| DMA-Tg | °C. | 247 | 246 | 247 | 250 | 251 | 249 | 249 | 251 | 248 | 252 |
| Z-PTE (50~260° C.) | % | 1.25 | 1.27 | 1.24 | 1.18 | 1.22 | 1.20 | 1.18 | 1.22 | 1.19 | 1.23 |
| Dk @10 GHz | / | 3.3 | 3.3 | 3.3 | 3.2 | 3.2 | 3.2 | 3.2 | 2.8 | 3.0 | 2.9 |
| Df @10 GHz | / | 0.0034 | 0.0033 | 0.0035 | 0.0030 | 0.0028 | 0.0029 | 0.0029 | 0.0026 | 0.0031 | 0.0028 |
| Warpage | μm | 25 | 23 | 27 | 31 | 30 | 29 | 30 | 32 | 28 | 31 |

TABLE 7

Results of resin compositions of Comparative Examples 1-9 (C1-C9)

| Condition | Unit | C1 | C2 | C3 | C4 | C5 | C6 | C7 | C8 | C9 |
|---|---|---|---|---|---|---|---|---|---|---|
| Resin filling void | / | OK | OK | OK | OK | void | void | void | OK | OK |
| DMA-Tg | °C. | 95 | 220 | 191 | 150 | 235 | 220 | 240 | 161 | 225 |
| Z-PTE (50~260° C.) | % | 2.67 | 1.95 | 2.35 | 2.51 | 1.44 | 1.61 | 1.43 | 2.40 | 2.11 |
| Dk @10 GHz | / | 3.2 | 3.2 | 3.2 | 3.5 | 3.4 | 3.5 | 3.2 | 3.4 | 3.4 |
| Df @10 GHz | / | 0.0025 | 0.0040 | 0.0031 | 0.0059 | 0.0047 | 0.0050 | 0.0031 | 0.0058 | 0.0047 |
| Warpage | μm | 80 | 41 | 52 | 70 | 37 | 42 | 35 | 61 | 43 |

From the results in Table 6 and Table 7 above, it can be observed that all Examples of the present disclosure can pass the resin filling void test without forming voids and, compared with Comparative Examples C1-C4 and C8-C9, can achieve excellent glass transition temperature, very low Z-axis ratio of thermal expansion, lower Dk and Df and very low warpage. In addition, Comparative Examples C5-C7 in Table 7 use the polyphenylene ether resin 1 from the PREPARATION EXAMPLE 1 but do not contain any one of compounds of Formula (2) to Formula (4), and all these Comparative Examples form voids and fail to pass the resin filling void test and fail to achieve similar desirable properties in glass transition temperature, Z-axis ratio of thermal expansion, Dk and Df and warpage as in Examples E1-E10.

What is claimed is:

1. A resin composition, comprising:

(A) a polyphenylene ether resin of Formula (1):

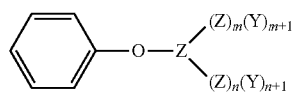

Formula (1)

wherein the Z group is a structure of Formula (2):

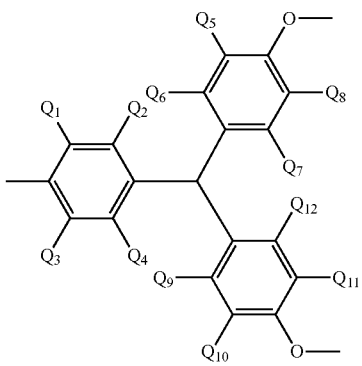

Formula (2)

in Formula (2), $Q_1$, $Q_2$, $Q_3$, $Q_4$, $Q_5$, $Q_6$, $Q_7$, $Q_8$, $Q_9$, $Q_{10}$, $Q_{11}$ and $Q_{12}$ are each independently hydrogen or a $C_1$-$C_6$ alkyl group;

the Y group is an unsaturated bond-containing end group;

$(Z)_m$ represents containing m Z groups, wherein each Z group is bonded via an ether bond to one to three adjacent Z groups and optionally to one or two Y groups, wherein the ether bond is from the Z group itself or from an adjacent Z group;

$(Z)_n$ represents containing n Z groups, wherein each Z group is bonded via an ether bond to one to three adjacent Z groups and optionally to one or two Y groups, wherein the ether bond is from the Z group itself or from an adjacent Z group;

$(Y)_{m+1}$ represents containing m+1 independent Y groups, each Y group being independently bonded via an ether bond to the Z group, wherein the ether bond is from the Z group adjacent to the Y group;

$(Y)_{n+1}$ represents containing n+1 independent Y groups, each Y group being independently bonded via an ether bond to the Z group, wherein the ether bond is from the Z group adjacent to the Y group;

m and n are independently a positive integer and $8 \leq m+n \leq 40$; and (B) a compound of Formula (3), and/or a compound of Formula (4), and/or a compound of Formula (5):

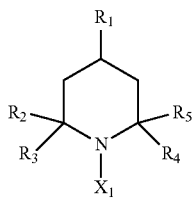

Formula (3)

in Formula (3), $X_1$ is an oxygen radical or a hydroxyl group, $R_2$ to $R_5$ each independently represent a hydrogen atom or a $C_1$-$C_5$ alkyl group, $R_2$ to $R_5$ are not a hydrogen atom at the same time, and $R_1$ is a hydrogen atom, a $C_1$-$C_5$ alkyl group, an amino group, a hydroxyl group, a carbonyl group or a carboxyl group;

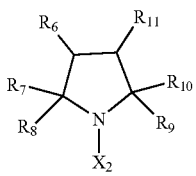

Formula (4)

in Formula (4), $X_2$ is an oxygen radical or a hydroxyl group, $R_7$ to $R_{10}$ each independently represent a hydrogen atom or a $C_1$-$C_5$ alkyl group, $R_7$ to $R_{10}$ are not a hydrogen atom at the same time, and $R_6$ and $R_{11}$ are independently a hydrogen atom, a $C_1$-$C_5$ alkyl group, an amino group, a hydroxyl group, a carbonyl group or a carboxyl group, or $R_6$, $R_{11}$ and carbon atoms bonded thereto together define a benzene ring;

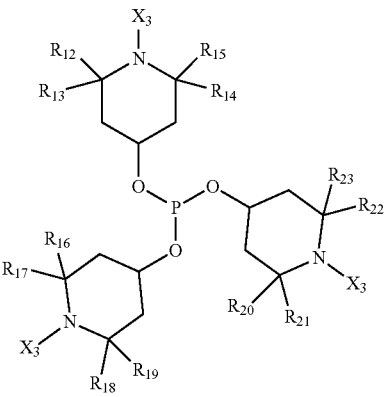

Formula (5)

in Formula (5), each $X_3$ is independently an oxygen radical or a hydroxyl group, $R_{12}$ to $R_{23}$ each independently represent a hydrogen atom or a $C_1$-$C_5$ alkyl group, and $R_{12}$ to $R_{23}$ are not a hydrogen atom at the same time.

2. The resin composition of claim 1, wherein the Y group in the polyphenylene ether resin of Formula (1) comprises one or more of the following unsaturated bond-containing end groups: $C_2$-$C_6$ alkenylbenzyl group, (meth)acryloyl group, phenylacryloyl group, fluorine-containing phenylacryloyl group and fluorine-containing $C_1$-$C_6$ alkylphenylacryloyl group.

3. The resin composition of claim 1, wherein the polyphenylene ether resin of Formula (1) comprises a polyphenylene ether resin of Formula (6), a polyphenylene ether resin of Formula (7), a polyphenylene ether resin of Formula (8) or a combination thereof:

Formula (6)
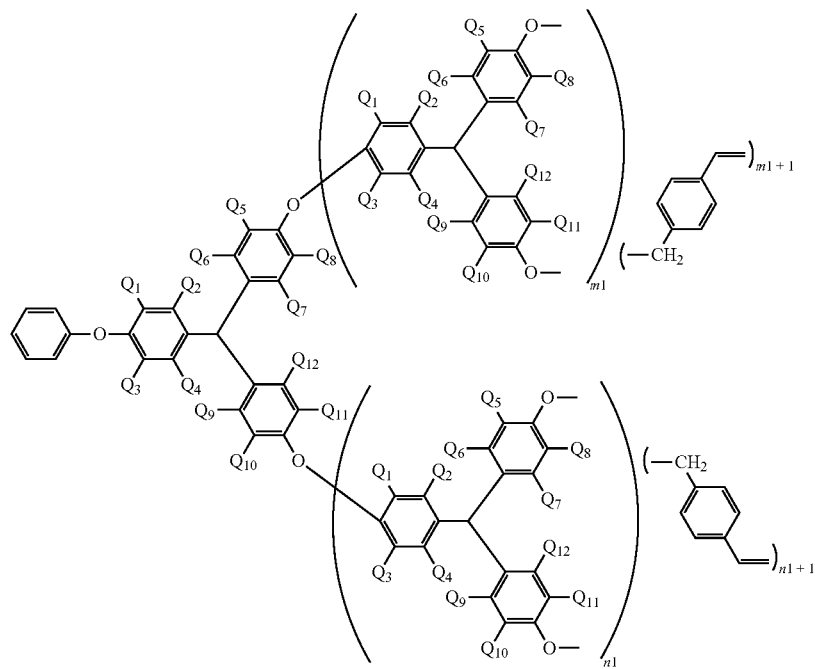
in Formula (6), m1 and n1 are independently a positive integer and 10≤m1+n1≤35;
Formula (7)
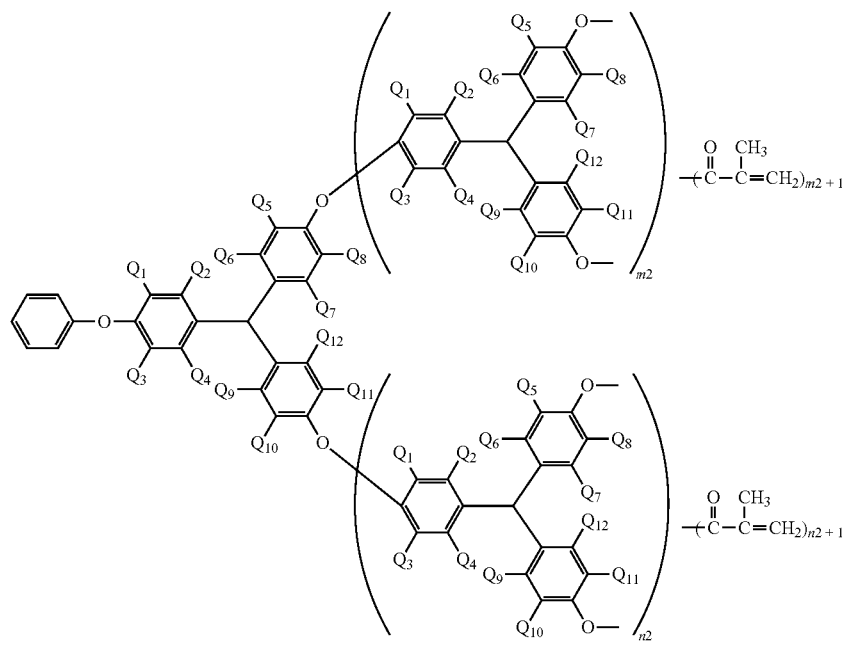
in Formula (7), m2 and n2 are independently a positive integer and 10≤m2+n2≤35;

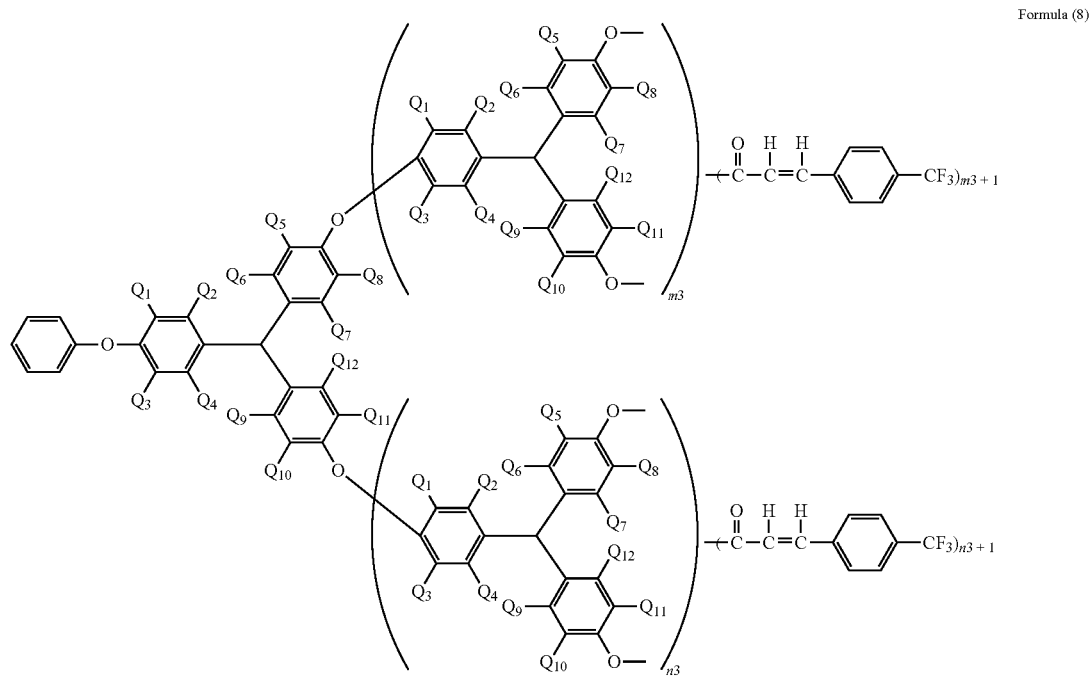

Formula (8)

in Formula (8), m3 and n3 are independently a positive integer and 10≤m3+n3≤35.

4. The resin composition of claim 1, wherein the polyphenylene ether resin of Formula (1) has an α value of 0.30 to 0.42.

5. The resin composition of claim 1, comprising 0.005 to 3 parts by weight of the compound of Formula (3), and/or the compound of Formula (4), and/or the compound of Formula (5) relative to 100 parts by weight of the polyphenylene ether resin of Formula (1).

6. The resin composition of claim 1, further comprising a vinyl-containing crosslinking agent, wherein the vinyl-containing crosslinking agent comprises 1,2-bis(vinylphenyl) ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate or a combination thereof.

7. The resin composition of claim 1, further comprising a benzoxazine resin, an epoxy resin, a polyester resin, a phenolic resin, a polyamide resin, a polyimide resin, a polyolefin, a styrene maleic anhydride, a maleimide resin, an organic silicone resin, a cyanate ester resin, a maleimide triazine resin or a combination thereof.

8. The resin composition of claim 1, further comprising an additive which comprises flame retardant, curing accelerator, inorganic filler, surface treating agent, coloring agent, amine curing agent, toughening agent, solvent or a combination thereof.

9. The resin composition of claim 1, further comprising 20 to 40 parts by weight of a vinyl-containing crosslinking agent and 15 to 50 parts by weight of a polyolefin relative to 100 parts by weight of the polyphenylene ether resin of Formula (1).

10. An article made from the resin composition of claim 1, wherein the article comprises a prepreg, a resin film, a laminate, or a printed circuit board.

* * * * *